(12) United States Patent
Koshiba et al.

(10) Patent No.: US 9,142,147 B2
(45) Date of Patent: Sep. 22, 2015

(54) MAP DATABASE GENERATING SYSTEMS, METHODS, AND PROGRAMS

(75) Inventors: Sadahiro Koshiba, Takahama (JP); Masahiro Tsujiko, Anjo (JP); Kazuteru Maekawa, Miyoshi (JP); Hironobu Sugimoto, Toyota (JP); Motohiro Nakamura, Toyota (JP); Kenji Yano, Higashioril (JP); Yuichi Ochi, Kitakysyu (JP); Shoji Iwata, Kitakyusyu (JP); Kenji Shono, Kitakyusyu (JP); Yoshikatsu Matsumoto, Nagoya (JP)

(73) Assignees: AISIN AW CO., LTD., Anjo (JP); TOYOTA JIDOSHA KABUSHIKI KAISHA, Toyota (JP); ZENRIN CO., LTD., Kitakyusyu (JP); TOYOTA MAPMASTER INCORPORATED, Nagoya (JP)

( * ) Notice: Subject to any disclaimer, the term of this patent is extended or adjusted under 35 U.S.C. 154(b) by 1315 days.

(21) Appl. No.: 11/992,748

(22) PCT Filed: Sep. 29, 2006

(86) PCT No.: PCT/JP2006/319498
§ 371 (c)(1),
(2), (4) Date: Jan. 7, 2010

(87) PCT Pub. No.: WO2007/037389
PCT Pub. Date: Apr. 5, 2007

(65) Prior Publication Data
US 2010/0121886 A1      May 13, 2010

(30) Foreign Application Priority Data
Sep. 30, 2005   (JP) ................. 2005-287337

(51) Int. Cl.
*G06F 7/00*      (2006.01)
*G06F 17/30*     (2006.01)
(Continued)

(52) U.S. Cl.
CPC ............... *G09B 29/00* (2013.01); *G01C 21/32* (2013.01); *G06T 17/05* (2013.01)

(58) Field of Classification Search
CPC ............ G06F 17/30241; G06F 21/123; G06F 2221/2111; G06F 17/30; G01C 21/3614; G01C 21/3667; G01C 21/3676
USPC .......................................... 707/803; 701/208
See application file for complete search history.

(56) References Cited

U.S. PATENT DOCUMENTS 6,836,781 B2 * 12/2004 McDonough ................. 707/803
(Continued)

FOREIGN PATENT DOCUMENTS

AU            755 096 B2    12/2002
(Continued)

OTHER PUBLICATIONS

Shibasaki, "First Edition—Topics related to Data Model of CAD/GIS—1.3. Importance of Data Model related to Construction of GIS", toward Realization of Electronic Government e-Japan, Data Model for the Construction Industry, (Japan, Kabushikigaisha Kohgakusha, Jul. 15, 2003, 1st Edition, pp. 42-48.
(Continued)

*Primary Examiner* — Azam Cheema
(74) *Attorney, Agent, or Firm* — Oliff PLC

(57) ABSTRACT

Systems, methods, and programs store feature information relating to features existing on a road and on the periphery of the road, each piece of feature information being associated with a unique identification symbol, each piece of feature information including disposition information expressing a spatial disposition of each feature independently of the road network, form information expressing a form of each feature, accuracy information expressing an accuracy of the information, and acquisition timing information expressing an acquisition timing of the information. The systems, methods, and programs (1) output the feature information stored in the feature database and input map information constituting the map database, the map information being generated based on the output feature information, or (2) generate map information constituting the map database on the basis of the feature information stored in the feature database.

16 Claims, 13 Drawing Sheets

(51) Int. Cl.
   *G09B 29/00* (2006.01)
   *G01C 21/32* (2006.01)
   *G06T 17/05* (2011.01)

(56) References Cited

U.S. PATENT DOCUMENTS

| | | | |
|---|---|---|---|
| 6,873,998 B1 * | 3/2005 | Dorum et al. | 1/1 |
| 7,096,117 B1 * | 8/2006 | Gale et al. | 701/208 |
| 7,376,508 B2 * | 5/2008 | Barkowski et al. | 701/208 |
| 7,406,482 B2 * | 7/2008 | Dorum et al. | 1/1 |
| 7,865,304 B2 * | 1/2011 | Gretton et al. | 701/210 |
| 2004/0008225 A1 * | 1/2004 | Campbell | 345/764 |
| 2004/0122590 A1 | 6/2004 | Ito et al. | |
| 2004/0172418 A1 * | 9/2004 | Dorum et al. | 707/104.1 |
| 2005/0004753 A1 * | 1/2005 | Weiland et al. | 701/208 |
| 2006/0074549 A1 * | 4/2006 | Takahashi et al. | 701/207 |
| 2007/0225902 A1 * | 9/2007 | Gretton et al. | 701/202 |

FOREIGN PATENT DOCUMENTS

| | | |
|---|---|---|
| EP | 0 782 118 A1 | 7/1997 |
| EP | 0 921 509 A2 | 6/1999 |
| JP | A-08-190566 | 7/1996 |
| JP | A-2002-340603 | 11/2002 |
| JP | A-2003-195746 | 7/2003 |
| JP | A-2003-195747 | 7/2003 |
| JP | A-2004-133094 | 4/2004 |
| JP | A-2004-198997 | 7/2004 |
| WO | WO 00/43953 | 7/2000 |

OTHER PUBLICATIONS

Japanese Patent Office, Notification of Reason(s) for Refusal mailed Jul. 7, 2011 in Japanese Patent Application No. 2005-287337 w/Partial English-language Translation.
ACTMAP: "Information Society Technologies. Actual and dynamic MAP for transport telemetric applications (Project No. IST-2001-34141; Deliverable No. D 3.3)—ActMAP ISO Input", Internet Citation, Nov. 12, 2004.

* cited by examiner

FIG. 3

SOURCING INFORMATION

| ITEM | CONTENT |
|---|---|
| SOURCE IDENTIFICATION SYMBOL | ID=********* |
| SOURCE TYPE | 1. AERIAL PHOTOGRAPH    5. SATELLITE PHOTOGRAPH<br>2. MEASUREMENT VEHICLE    6. TOWN PLANNING MAP<br>3. TECHNICAL DRAWING    7. NATIONAL BASIC MAP<br>4. ON-SITE SURVEY    8. RESIDENTIAL MAP |
| SOURCE SCALE | 1/10000 |
| POSITIONAL ACCURACY | **[cm] |
| FORM ACCURACY | LEVEL: ** |
| SOURCING DATE AND TIME | DATE: //<br>TIME: :** |
| FEATURE INFORMATION GENERATION DATE | DATE: //** |

F3

- 16: SOURCE IDENTIFICATION SYMBOL
- F3a { 17: SOURCE TYPE, 18: SOURCE SCALE, 19: POSITIONAL ACCURACY, 20: FORM ACCURACY }
- F3b { 21: SOURCING DATE AND TIME, 22: FEATURE INFORMATION GENERATION DATE }

F I G . 4
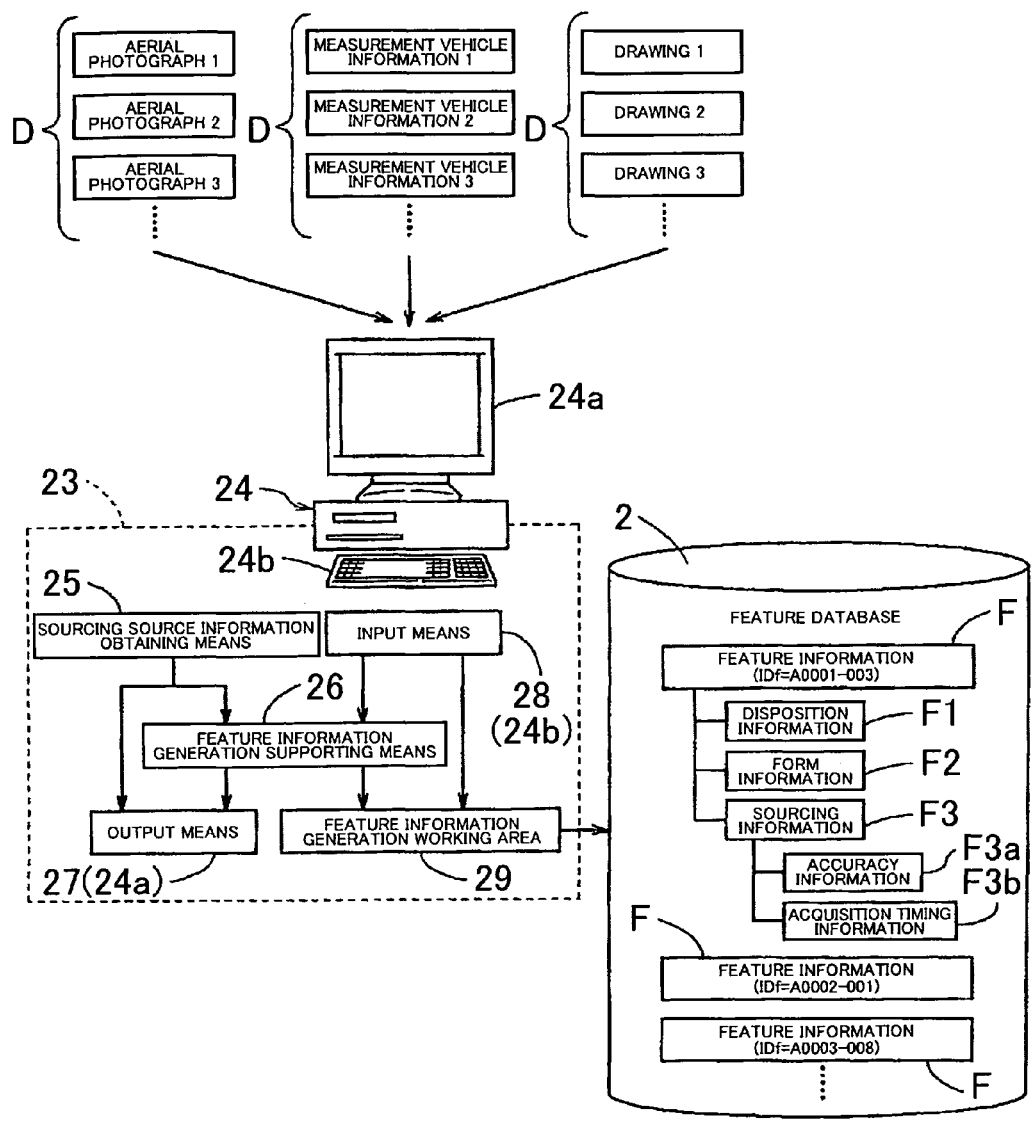

STOP LINE

ROAD SIGN

PAINTED ALPHANUMERICAL CHARACTERS

PEDESTRIAN CROSSING

PAINTED DIRECTION ARROW

FIG. 6A
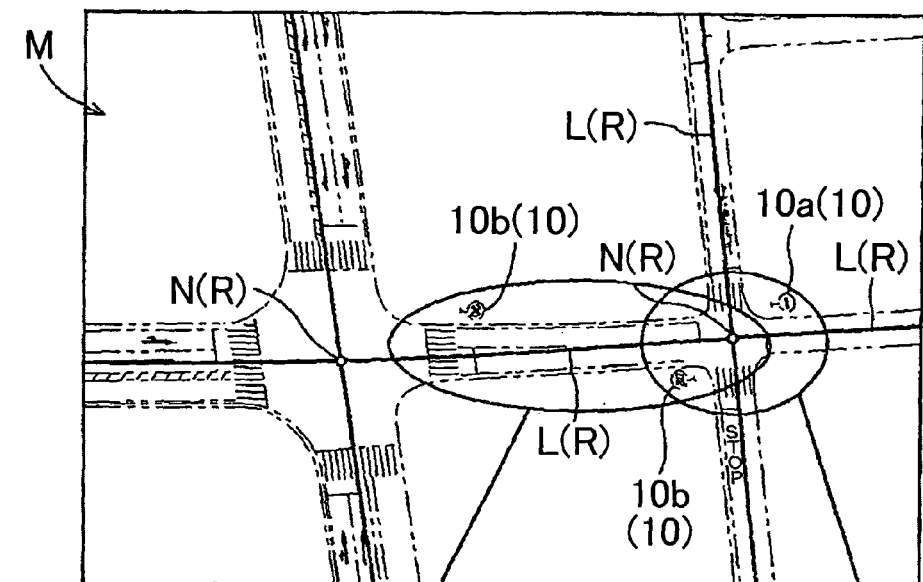
FIG. 6B
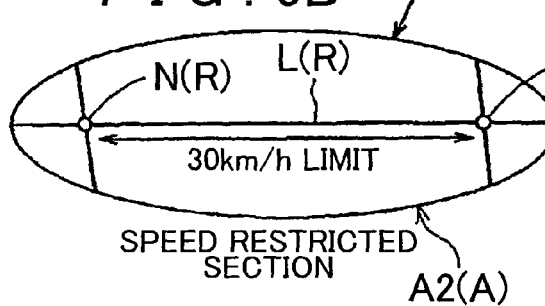
FIG. 6C
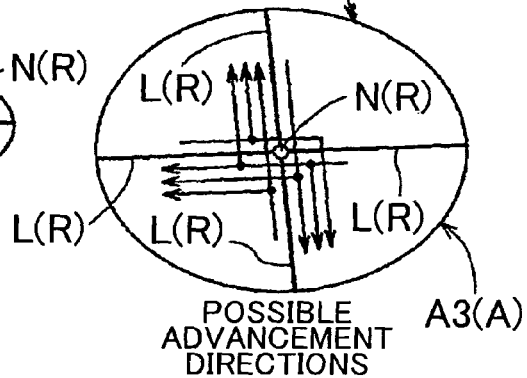
FIG. 7
| MAP INFORMATION | GENERATION SOURCE FEATURE INFORMATION IDENTIFICATION SYMBOL | | | |
|---|---|---|---|---|
| ID=B0001 | A0011-002 | A0106-007 | A0334-001 | |
| ID=B0002 | A0036-003 | | | |
| ID=B0003 | A0082-001 | A0406-005 | | |
| ⋮ | | | | |

F I G . 12
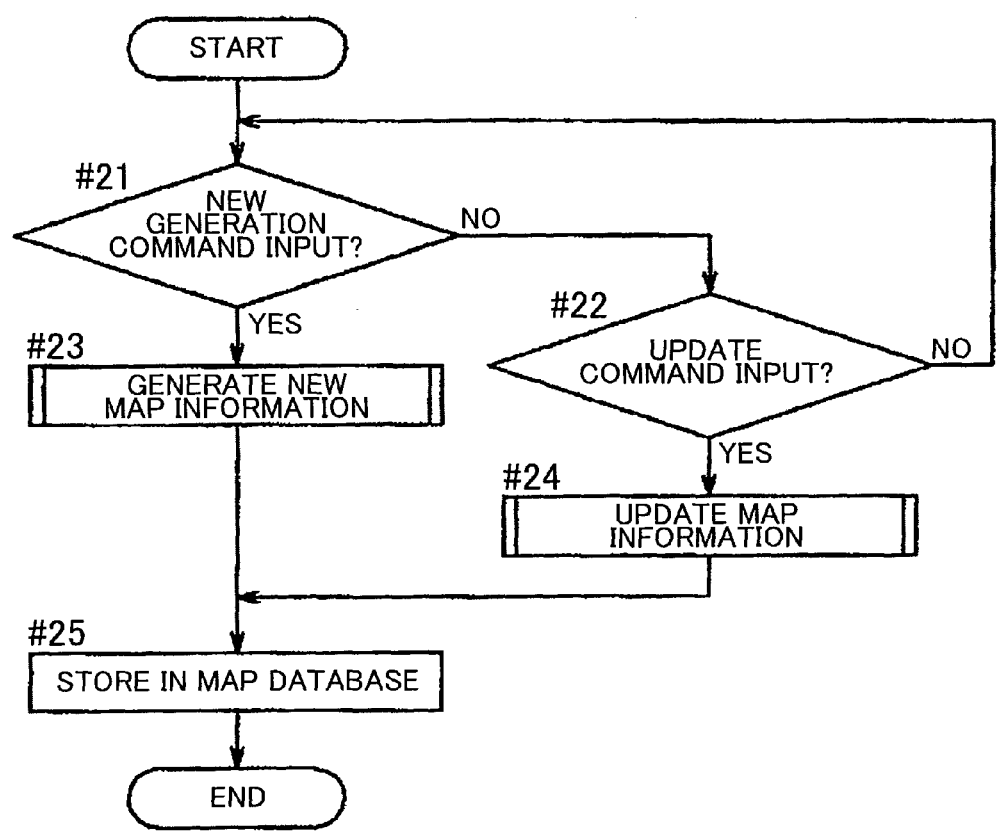

MAP DATABASE GENERATING SYSTEMS, METHODS, AND PROGRAMS

INCORPORATION BY REFERENCE

This application is the U.S. National Phase of International Application No. PCT/JP2006/319498, filed Sep. 29, 2006, which claims priority of Japanese Patent Application No. 2005-287337, filed Sep. 30, 2005. The disclosures of the prior applications, including the specification, drawings, and claims, are hereby incorporated by reference in their entirety.

BACKGROUND

1. Related Technical Field

Related technical fields include systems, methods, and programs for generating an electronic map database suitable for use in a navigation systems.

2. Related Art

Japanese Patent Application Publication No. 2003-195747 (pages 5-6 and 10-11, FIG. 3, and FIG. 17) describes a system for generating an electronic map database. The structure of this system is shown in FIG. 15. A map data generating device 101 formed by installing a predetermined program on a general-purpose computer constitutes the nucleus of the system. On the basis of a road database 102 defined by links constituted by line segments and nodes serving as intersection points between the links, and an aerial photograph 103, attribute information is set in relation to each of the links in the road database 102. Thus, a new map database is generated. Here, attribute information is information regarding the structure and traffic regulations of each link.

The map data generating device 101 includes a command input portion 104, a database referencing portion 105, a polygon generating portion 106, a pattern database 107, a pattern analysis portion 108, an attribute setting portion 109, and a result output portion 110. The command input portion 104 inputs a command from an operator. The database referencing portion 105 references the road database 102 and the aerial photograph 103 on the basis of the input command. The polygon generating portion 106 generates a closed figure from each of the links defined in the road database 102 (to be referred to hereafter as a polygon) having a predetermined surface area. The pattern database 107 stores various image patterns included in the aerial photograph 103 in association with corresponding attributes.

For example, the pattern database 107 stores an association between the "parking lot" attribute and a pattern such as that found in a parking lot, in which short line segments forming a vehicle parking space are disposed at fixed intervals, or an association between the "no passing" attribute and a yellow line such as a center line. The pattern analysis portion 108 reads the aerial photograph 103 and analyzes the image patterns included therein on the basis of the pattern database 107. The attribute setting portion 109 sets attribute information in relation to the links in the road database 102 on the basis of an analysis result of the pattern analysis portion 108. The result output portion 110 receives a setting result from the attribute setting portion 109, associates the attribute information with each link, and outputs a new map database.

SUMMARY

In the system described above, a new map database is generated by associating the attribute information obtained by analyzing the aerial photograph 103 with the links in the road database 102. The attribute information includes sidewalks, central dividers, overpasses, traffic lights, bridges, tunnels, pedestrian crossings, parking lots, one-way traffic, no entry, road closed, no passing, and the number of lanes. Almost all of the attribute information is obtained as the result of a fixed interpretation of the information displayed on the aerial photograph 103. For example, attribute information such as one-way traffic and no entry is obtained by interpreting the content, disposition, and so on of road signs.

Accordingly, an operation to update the map database cannot be performed efficiently. More specifically, when the latest on-site information is obtained from a new aerial photograph 103, the results of a survey performed by a measurement vehicle, and so on, the map database is updated by determining whether the information stored in the map database has varied with time and reflecting the content of the variation in the map database when variation has occurred. At this time, the determination whether the information has varied with time is made by comparing the on-site information, such as the aerial photograph 103, with the map database. But in order to achieve this, information indicated by on-site information in a past aerial photograph 103 or the like must be inferred from the interpreted attribute information in the map database and then compared with the latest on-site information. Hence, a large workload is required to update the map database, leading to a reduction in efficiency, and moreover, the accuracy of the update is greatly affected by the experience and skill of the operator.

Furthermore, when the functions, representation method, and so on of the map database are to be modified, and the amount of information required in the map database has increased, the information must be gathered anew, even if only a short period of time has elapsed since information was gathered previously from the aerial photograph 103, a survey by the measurement vehicle, and so on. As a result, information is gathered in duplicate, creating wasteful expenditure and even more inefficiency.

As is evident from the above, in a conventional map database generating system, map database generation, updating, and other operations are inefficient and expensive, and it is difficult to create a highly accurate, highly up-to-date map database.

Exemplary implementations of the broad principles described herein provide a map database generating system capable of generating a highly accurate, highly up-to-date map database by increasing the efficiency of operations to generate and update the map database.

Exemplary implementations provide systems, methods, and programs for generating a map database, the map database including a road network comprising a plurality of nodes having position information and a link connecting two of the nodes, and road attribute information associated with the road network. The systems, methods and programs store feature information relating to features existing on a road and on the periphery of the road, each piece of feature information being associated with a unique identification symbol, each piece of feature information including disposition information expressing a spatial disposition of each feature independently of the road network, form information expressing a form of each feature, accuracy information expressing an accuracy of the information, and acquisition timing information expressing an acquisition timing of the information. The systems, methods, and programs output the feature information stored in the feature database and input map information constituting the map database, the map information being generated based on the output feature information.

Exemplary implementations provide systems, methods, and programs for generating a map database, the map database including a road network comprising a plurality of nodes having position information and a link connecting two of the nodes, and road attribute information associated with the road network. The systems, methods and programs store feature information relating to features existing on a road and on the periphery of the road, each piece of feature information being associated with a unique identification symbol, each piece of feature information including disposition information expressing a spatial disposition of each feature independently of the road network, form information expressing a form of each feature, accuracy information expressing an accuracy of the information, and acquisition timing information expressing an acquisition timing of the information. The systems, methods, and programs generate map information constituting the map database on the basis of the feature information stored in the feature database.

BRIEF DESCRIPTION OF THE DRAWINGS

Exemplary implementations will now be described with reference to the accompanying drawings, wherein:

FIG. 3 is a view showing an example of the content of sourcing information included in feature information;

FIG. 4 shows a schematic structure of an exemplary feature database generating system;

FIG. 6A-6C are a conceptual diagram illustrating an example of the content of the map database;

FIG. 7 shows an exemplary table storing identification symbol information;

FIG. 12 is a flowchart showing an exemplary map information generation method;

DESCRIPTION OF EXEMPLARY IMPLEMENTATIONS

Figure 1:
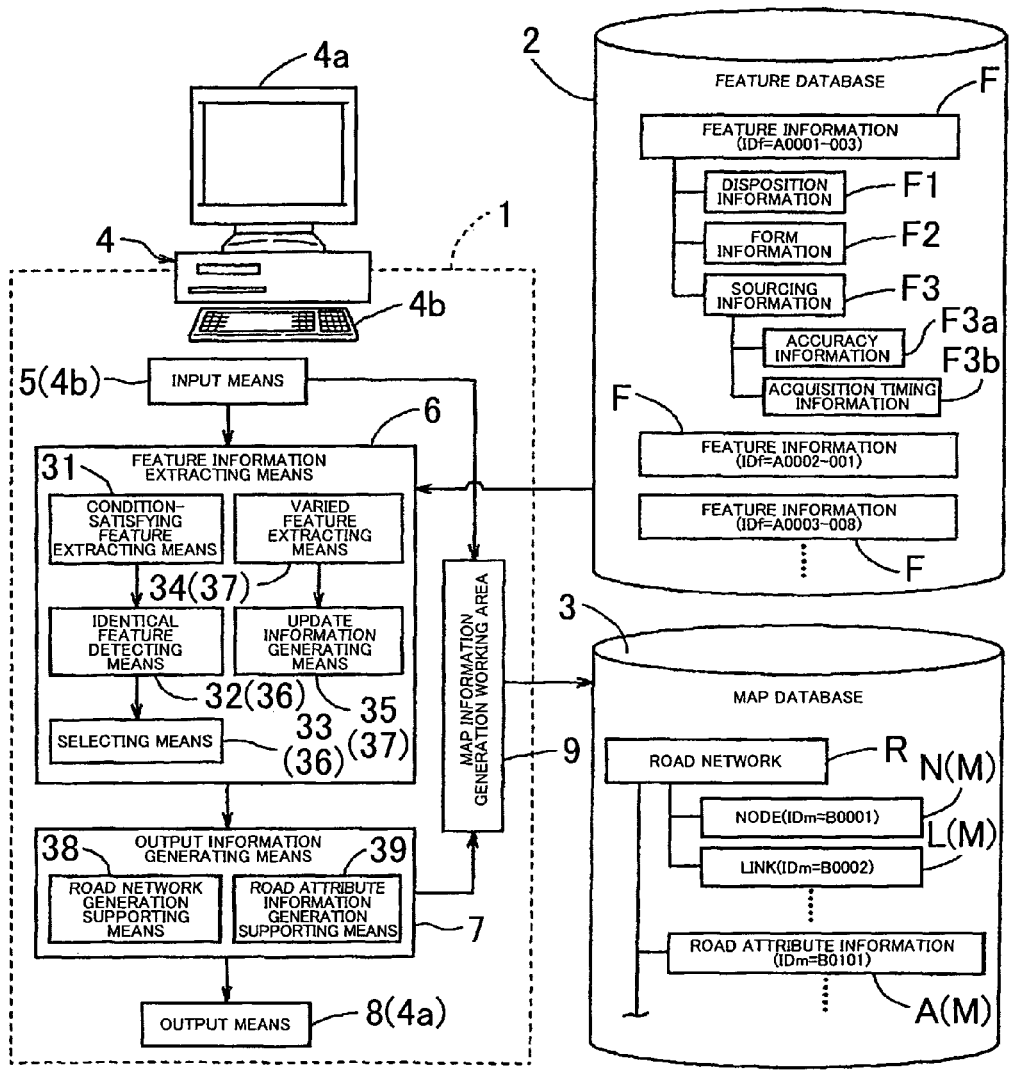
FIG. 1 shows a schematic structure of an exemplary map database generating system.

FIG. 1 is an illustrative view showing the schematic structure of an exemplary map database generating system. This map database generating system is a support system for supporting the generation of a map database 3 by an operator. As shown in FIG. 1, the map database generating system includes a feature database 2, a map database 3, and a system main body 1 formed, for example, by installing a program for realizing the functions of various portions (to be described below) on a general-purpose computer 4 (controller) that is connected accessibly to the feature database 2 and the map database 3.

The system main body 1, may physically, functionally, and/or conceptually include an input portion 5, feature information extracting portion 6, output information generating portion 7, output portion 8, and a map information generation working area 9. The structure of each part of the map database generating system will be described in detail below.

Figure 2:
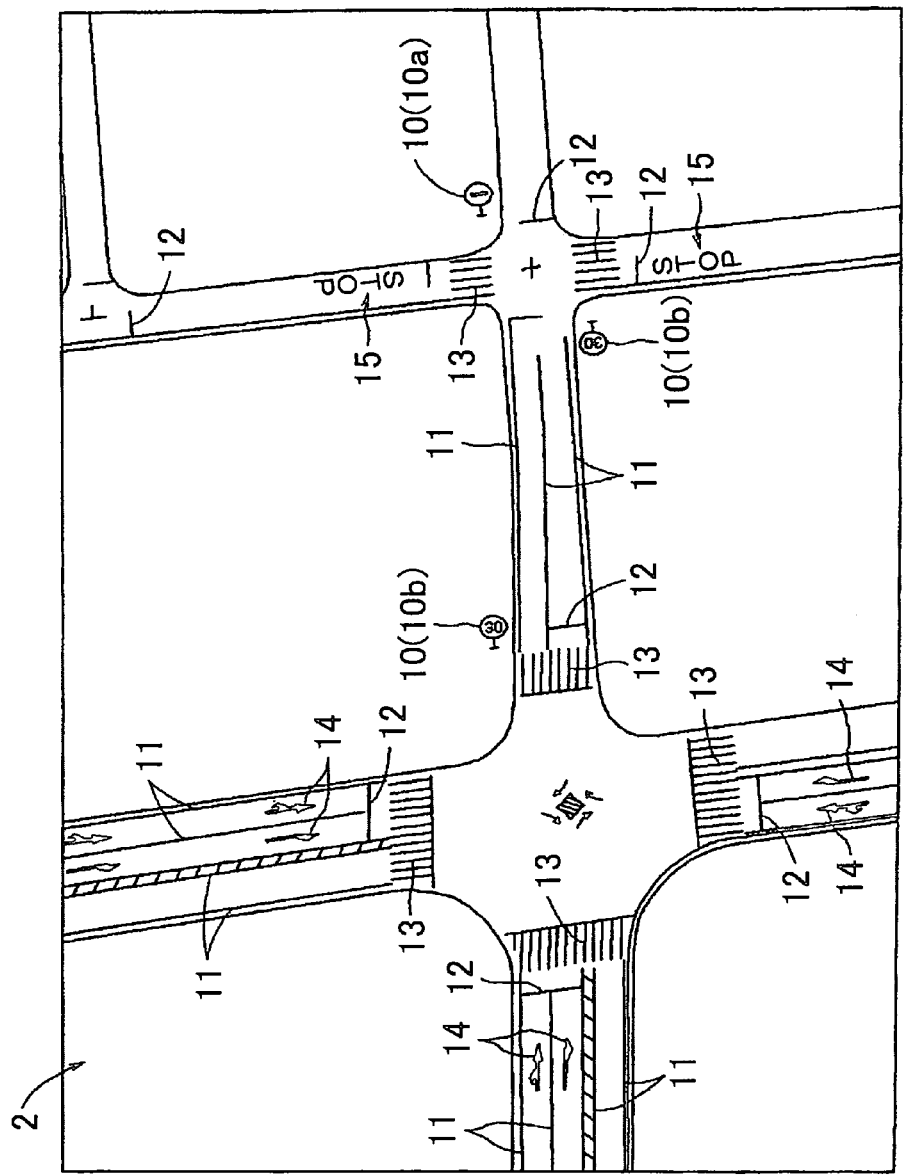
FIG. 2 is a conceptual diagram illustrating an example of the content of a feature database.

The feature database 2 is a database storing information regarding features existing on roads and on the periphery of the roads as feature information F, which is associated with an identification symbol IDf unique to each feature. FIG. 2 is a conceptual diagram illustrating a part of the content of the feature database 2. As shown in FIGS. 1 and 2, the feature database 2 is basically a database created by turning information regarding features existing on roads and on the periphery of the roads into data that faithfully represent on-site conditions on the basis of sourcing information. As will be described below, each piece of feature information F in the feature database 2 is defined independently of a road network R constituted by nodes N and links L. Further, each piece of feature information F includes disposition information F1, form information F2, and sourcing information F3.

As shown in FIG. 2, examples of the features stored in the feature database 2 as the feature information F include painted features provided on roads such as painted lane boundaries 11, painted direction arrows 14, painted alphanumerical characters 15, and painted symbols. The features also include traffic regulation features expressing traffic regulations, such as road signs 10 (in FIG. 2, a no entry road sign 10a and a speed restriction road sign 10b are shown), traffic lights, crossing bars, stop lines 12, and the painted direction arrows 14. The features also include road area defining features defining road areas, such as the painted lane boundaries 11, central dividers, curbs, safety fences, buildings, and bodies of water. Other examples of the features include manholes, emergency telephones, pedestrian crossings 13, tunnels, bridges, rail track, and elevated walkways. Features that do not take the form of physical objects, such as the gradient, altitude, and cant of each point on a road may also be included in the feature information F. Note that the painted lane boundary 11 corresponds to both a painted feature and a road area defining feature, while the painted direction arrow 14 corresponds to both a painted feature and a traffic regulation feature. FIG. 2 shows only a small part of the features, and the features illustrated in FIG. 2 have been allocated reference numerals. Here, the unit of a single feature may be set arbitrarily, but is preferably set at a minimum unit, taking into account the function of the feature.

The identification symbol IDf is a unique symbol allocated to each feature. Here, common identification symbols IDf are allocated to feature information F relating to identical features based on different sourcing source information D (see FIG. 4). The common identification symbol IDf is preferably a symbol in which only the final digits differ, for example. The identification symbol ID shown in FIG. 1 is an example, and here, identical features are indicated by an identification symbol IDf in which the first five digits, i.e. "A0001" or the like, are shared and only the final three digits following the "-" symbol, i.e. "003" or the like, differ. Hence, when new sourcing source information D is obtained in relation to an absolute coordinate region in which feature information F has already been developed, a common identification symbol IDf is allocated to the feature information F of a feature that has not varied from the condition of the feature represented by the past feature information F. On the other hand, a new identification symbol IDf is allocated to feature information F relating to a newly added feature. The identification symbol IDf of feature information F relating to a feature that has been removed is invalidated.

Features that have been modified in content, for example features that have been modified in position or form, may be dealt with in a similar manner to a case in which a past feature is removed and a new feature is added. Thus, a new identification symbol IDf which is different from the feature information F prior to modification is allocated to the new feature information F following modification, and the identification symbol IDf of the feature information F prior to modification is invalidated.

Hereafter, features that have been added, removed, or modified will all be referred to as "features that have varied from past feature conditions," and the addition, removal, or modification of such a feature will be referred to as "variation in the condition of the feature." Here, variation in the condition of the feature is determined by comparing the absolute coordinate region in which the new sourcing source information D is obtained with the past feature information F stored in the feature database 2 in relation to the same region. Further, past feature information F is determined on the basis of acquisition timing information F3b within the sourcing information F3. As will be described below, the sourcing source information D is information indicating on-site conditions, such as an aerial photograph, measurement vehicle information, and various types of drawings.

The disposition information F1 is information indicating the spatial position of each feature independently of the road network in terms of points, lines, planes and the like on absolute coordinates represented by longitude and latitude. For example, the disposition information F1 indicates the position of a point representing the position of features such as road signs 10, traffic lights, manholes, emergency telephones, and crossing bars. The disposition information F1 also indicates the position of a line (polyline) representing the central shape of features such as painted lane boundaries 11, central dividers, curbs, safety fences, stop lines 12, pedestrian crossings 13, tunnels, and rail track. The disposition information F1 also indicates the disposition of a plane (polygon) representing the region of features such as painted direction arrows 14, painted alphanumerical characters 15, painted symbols, overpasses, buildings, and bodies of water.

The form information F2 is information indicating the form of each feature, such as the type, shape, color, and size. For example, when the feature is the road sign 10, the form information F2 includes information relating to the type, or in other words the content, of the road sign 10, the orientation of the road sign 10, the height of the road sign 10 from the road surface, the size of the road sign 10, and so on. When the feature is the painted lane boundary 11, the form information F2 includes information relating to the type of line, the planar (polygon) form, the color, the width, the presence or absence of surface projection, and so on. When the feature is the stop line 12, the form information F2 includes information relating to the planar (polygon) form, width, and so on. When the feature is the pedestrian crossing 13, the form information F2 includes information relating to the planar (polygon) form, the line width, and so on. When the feature is the painted direction arrow 14, the form information F2 includes information relating to the type of arrow, or in other words the instructed advancement direction, the planar (polygon) form of the region in which the direction arrow is disposed, a reference point, the color, the line width, and so on. When the feature is the painted alphanumerical character 15, the form information F2 includes information relating to the content of the alphanumerical characters, the planar (polygon) form of the region in which the alphanumerical characters are disposed, a reference point, the color, the line width, and so on.

The sourcing information F3 is information relating to the source of the information that serves as a basis when the feature information F is generated, and includes accuracy information F3a indicating the informational accuracy of the feature information F, and the acquisition timing information F3b indicating the acquisition timing of the feature information F. FIG. 3 shows the content of the sourcing information F3. As shown in this drawing, the sourcing information F3 includes a source identification symbol 16, a source type 17, a source scale 18, positional accuracy 19, form accuracy 20, a sourcing date and time 21, and a feature information generation date 22 as information items.

The source identification symbol 16 is a unique symbol representing the sourcing source information D (see FIG. 4). When the sourcing source information D is an aerial photograph, a drawing or the like, for example, a different symbol is allocated to each photograph or drawing, and when the sourcing source information D is a moving image generated by a measurement vehicle or as a result of an on-site survey, a different symbol is allocated to each file. The source type 17 denotes the type of the sourcing source information D from which the feature information F is generated. Here, the source type 17 may be 1: an aerial photograph, 2: a measurement vehicle, 3: a technical drawing, 4: an on-site survey, 5: a satellite photograph, 6: a town planning map, 7: a national land map, 8: a residential map, and so on. The source scale 18 is the scale of the drawing or the like constituting the sourcing source information D. Note that when a moving image or the like in which the concept of scale does not exist is the sourcing source information D, information relating to the source scale 18 does not exist.

The positional accuracy 19 is positional accuracy information relating to the disposition of the feature information F on absolute coordinates. Here, the positional accuracy 19 is calculated on the basis of the source type 17, the source scale 18, and so on, and is expressed in units of [cm]. The form accuracy 20 is accuracy information relating to the shape, size and so on in the information constituting the form information F2 of the feature information F. Here, the form accuracy 20 is expressed by an integer value indicating a level set on the basis of the source type 17, the source scale 18, and so on. The sourcing date and time 21 is information indicating the date and time at which the sourcing source information D is obtained. In the case of an aerial photograph, a moving image produced by a measurement vehicle, and so on, for example, the date and time at which the photograph or image was captured is used as the sourcing date and time 21, and in the case of a drawing or the like, the date and time at which the drawing was created is used as the sourcing date and time 21. The feature information generation date 22 is information indicating the date on which the feature information F was generated on the basis of the sourcing source information D.

In this example, the source type 17, the source scale 18, the positional accuracy 19, and the form accuracy 20 constitute the accuracy information F3a, while the sourcing date and time 21 and the feature information generation date 22 constitute the acquisition timing information F3b.

FIG. 4 is an illustrative view showing the schematic structure of a feature database generating system 23 for generating the feature database 2 described above. The feature database generating system 23 is a support system for supporting the generation and updating of the feature database 2 by an operator. As shown in FIG. 4, the feature database generating system 23 may be formed by installing a program for realizing the functions of various portions to be described below on a general-purpose computer 24 connected accessibly to the feature database 2. Here, the feature database generating system 23 may physically, functionally, or conceptually include sourcing source information obtaining portion 25, feature information generation supporting portion 26, output portion 27, input portion 28, and a feature information generation working area 29.

The sourcing source information obtaining portion 25 obtains the sourcing source information D, such as an aerial photograph, measurement vehicle information, and various types of drawings. The sourcing source information obtaining portion 25 includes a recording media drive, a communication port or the like for reading data into the computer 24.

The input portion 28 is used by the operator to input commands, information and so on into the computer 24 of the feature database generating system 23. Here, the input portion 28 includes a keyboard 24b of the computer 24, a mouse, not shown in the drawing, or similar. As will be described below, the operator uses the input portion 28 to input commands or information for generating the feature information F, including new generation and updating, on the basis of the content of the sourcing source information D output by the output portion 27, the content of operation support information generated by the feature information generation supporting portion 26, and so on. New or modified feature information F is generated in the feature information generation working area 29 in accordance with the input from the operator through the input portion 28.

The feature information generation supporting portion 26 supports the generation of the feature information F, which is performed by the operator on the basis of the obtained sourcing source information D. The feature information generation supporting portion 26 generates operation support information for supporting an operation to generate the feature information F, outputs this information to the output portion 27, and outputs the results of various processing for generating the feature information F to the feature information generation working area 29. The operation support information generated by the feature information generation supporting portion 26 includes a graphical user interface of command items (commands) that are used during a feature information F generation operation based on the sourcing source information D, an editing image, and so on. To support the feature information F generation operation performed by the operator, the feature information generation supporting portion 26 performs image processing such as binarization processing for extracting a painted feature, analysis processing, etc. on the sourcing source information D, outputs the processing result to the feature information generation working area 29, and outputs the processing result to the output portion 27, where the processing result is displayed as an editing image.

The editing image generated by the feature information generation supporting portion 26 preferably includes an image displayed in such a fashion that a part or all of the content of the obtained sourcing source information D can be compared with past feature information F in the same absolute coordinate region as the coordinate region including the sourcing source information D. Thus, the operator can determine whether a variation in the condition of a feature has occurred between the obtained sourcing source information D and the past feature information F. In this manner, an operation to allocate a common identification symbol IDf or a new identification symbol IDf, an operation to invalidate the identification symbol IDf of feature information F relating to a pre-modification or removed feature, and so on can be performed easily in accordance with the presence or absence of condition variation between the newly generated feature information F and the past feature information F.

The output portion 27 outputs the content of the obtained sourcing source information D, the content of the operation support information generated by the feature information generation supporting portion 26, and so on. Here, the output portion 27 is constituted by a monitor 24a of the computer 24, which displays various types of information. Although not shown in the drawing, another output device such as a printer may be used as the output portion 27.

The feature information generation working area 29 is a working memory area for generating the feature information F (including both new generation and updating), which temporarily stores the feature information F during an operation, the content of the operation support information, and so on. The feature information F generated in the feature information generation working area 29 is input into the feature database 2 in accordance with a command from the input portion 28.

Returning to FIG. 1, the map database 3 is a database having a road network R including nodes N and links L and road attribute information A associated with the road network R as map information M. Each piece of map information M (each node N, each link L, and each piece of road attribute information A) is stored in the map database 3 in association with a unique identification symbol IDm. Here, the map database 3 is a map database used in a car navigation system for automobile travel route guidance and the like.

FIGS. 5 and 6 are conceptual diagrams illustrating parts of the content of the map database 3 corresponding to the feature database 2 shown in FIG. 2. As shown in these drawings, the road network R is constituted by a large number of nodes N having absolute coordinate position information expressed in terms of longitude and latitude, and a large number of links L, each connecting two of the nodes N. As shown in FIGS. 5A and 6A, the node N is disposed near the center of an intersection point. The link L is disposed near the width direction center of the road in accordance with the road shape. The road network R is generated on the basis of feature information F relating to road area defining features defining a road area, such as painted lane boundaries 11, central dividers, curbs, safety fences, buildings, and bodies of water.

The road attribute information A may be divided into three main types, point attribute information A1, section attribute information A2, and route attribute information A3. The point attribute information A1 is road attribute information A associated with a point on the road network R. FIG. 5 shows specific examples of the point attribute information A1. This drawing shows information relating to the road sign 10, the stop line 12, the pedestrian crossing 13, the painted direction arrow 14, and the painted alphanumerical character 15 as specific examples of the point attribute information A1. This point attribute information A1 includes reference point information serving as information regarding the position of a reference point P set on the road network R, and disposition information denoting the actual position in terms of an offset distance, a bearing, a planar disposition, a linear disposition and so on, relative to the reference point P. The point attribute information A1 also includes direction information W specifying a direction along a link L in relation to information requiring a single fixed advancement direction.

Figure 5A:
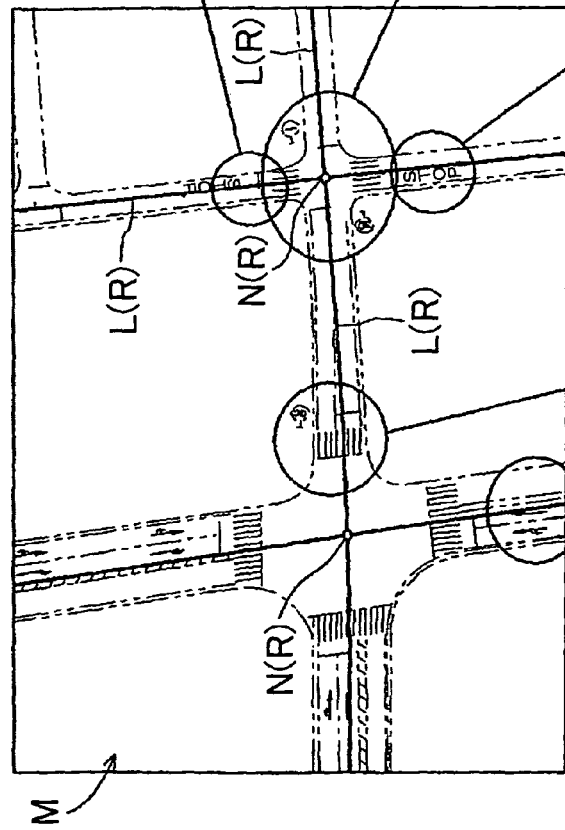
FIGS. 5A-5F are a conceptual diagram illustrating an example of the content of a map database.
Figure 5C:
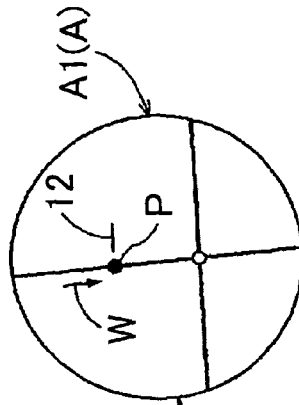
Figure 5B:
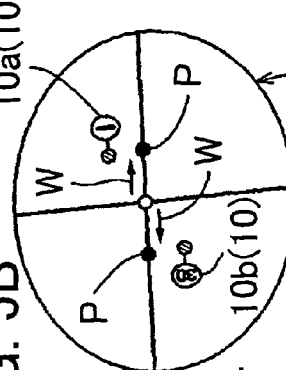

Specifically, as shown in FIG. 5B, the road attribute information A relating to the road sign 10 includes reference point information serving as information regarding the position of a reference point P set in a position on the road network R that is closest to the actual position, disposition information indicating the actual position in terms of the offset distance and bearing from the reference point P, direction information W specifying the advancement direction to the subject road sign, type information indicating the type of road sign, for example "no entry" or "maximum speed limit 30 km/h," road sign size information indicating the size of the road sign, height information from the road surface, and so on.

Figure 5F:
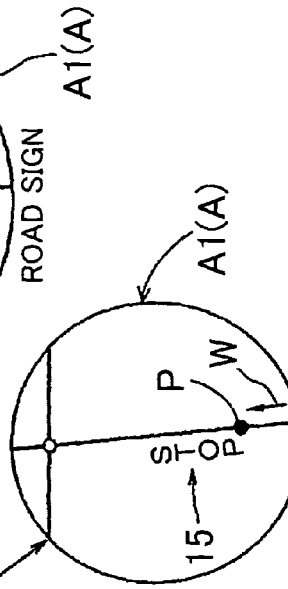
Figure 5D:
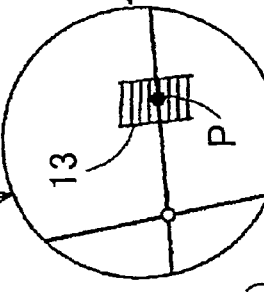

As shown in FIG. 5C, the road attribute information A relating to the stop line 12 includes reference point information relating to the reference point P, similarly to the road sign 10, disposition information indicating the position of a center line of the stop line 12 relative to the reference point P, direction information W specifying the advancement direction to the subject stop line, information indicating the line width, information indicating the color of the line, and so on. As shown in FIG. 5D, the road attribute information A relating to the pedestrian crossing 13 includes reference point information relating to the reference point P, similarly to the road sign 10, disposition information indicating the area of the road surface on which the pedestrian crossing 13 is provided relative to the reference point P, information indicating the number of lines, information indicating the line width, information indicating the color of the line, information indicating the presence of an outer frame, and so on.

Figure 5E:
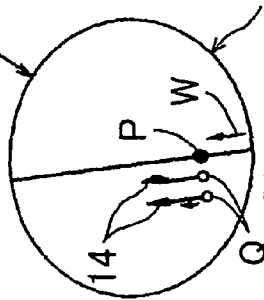

As shown in FIG. 5E, the road attribute information A relating to the painted direction arrow 14 includes reference point information relating to the reference point P, similarly to the road sign 10, auxiliary reference point information, which is information indicating the position of an auxiliary reference point Q set at an arrow base point of each painted arrow relative to the reference point P, information indicating the type of the painted arrow having the auxiliary reference point Q as its base point, information indicating the line width, information indicating the color of the line, and so on. As shown in FIG. 5F, the road attribute information A relating to the painted alphanumerical character 15 includes reference point information relating to the reference point P, similarly to the road sign 10, disposition information indicating the area of the road surface on which the painted alphanumerical character 15 is provided relative to the reference point P, information indicating the content of the alphanumerical characters, information indicating the line width, information indicating the color of the lines, and so on. This point attribute information A1 is generated on the basis of the feature information F relating respectively to the road sign 10, stop line 12, pedestrian crossing 13, painted direction arrow 14, and painted alphanumerical character 15.

The section attribute information A2 is road attribute information A associated with a fixed section of the road network R. The route attribute information A3 is road attribute information A associated with a single node N (intersection point) on the road network R and one or more links L connected to the node N. FIG. 6 shows specific examples of the section attribute information A2 and the route attribute information A3. This drawing shows information relating to a speed restricted section as a specific example of the section attribute information A2, and information relating to the possible advancement directions between a plurality of links L gathered around a single node N as a specific example of the route attribute information A3.

The section attribute information A2 includes information regarding a section set within a single link L or straddling a plurality of links L, direction information specifying a direction along a link L relating to the advancement directions within the section, theme information indicating the type and content of the section, and so on. Specifically, section attribute information A2 relating to the speed restricted section shown in FIG. 6B, for example, includes section information in which the entire area of a single link L is set as a section, direction information set in two directions (not limited to one direction), and subject information indicating the restriction type, in this case a maximum speed limit of 30 km/h. The section attribute information A2 for this speed restricted section is generated on the basis of the feature information F of a speed restriction road sign 10*b* indicating "maximum speed limit of 30 km/h," which is provided near the two end portions of the link L. The section attribute information A2 also includes information indicating traffic regulations in a specific section, similarly to the speed restriction described above, such as the number of lanes or a section in which parking is prohibited, information relating to a section having a specific road structure such as a tunnel or a bridge, information relating to the gradient, altitude, cant, and so on of the roads in each section, and so on.

The route attribute information A3 includes directional route information associated with a single node N (intersection point) on the road network R and one or more links L connected to the node N, subject information indicating the type and content of the route, and so on. Specifically, the route attribute information A3 relating to the possible advancement directions shown in FIG. 6C, for example, includes route information indicating a possible route between four links L gathered around a single node N, and subject information indicating the cause of a restriction, in this case no entry. The route attribute information A3 relating to possible advancement directions is generated on the basis of the feature information F of the no entry road sign 10*a*, which is provided near the connection portion of a single link L connected to the node N. The route attribute information A3 also includes information indicating seasonal traffic restrictions, information indicating restrictions having a physical cause, such as a staircase, and so on.

In addition to the above, each piece of map information M also includes information regarding the identification symbol IDf of the one or more pieces of feature information F serving as the generation source thereof. As shown in FIG. 7, the map database 3 includes a table storing information regarding the identification symbols IDf of the feature information F serving as the generation source of each piece of map information M in association with the identification symbol IDm of each piece of map information M. Hence, as will be described below, an operation to reflect the results of variation in the feature information F in the map information M stored in the map database 3 can be performed easily.

Returning to FIG. 1, the input portion 5 enables the operator to input commands, information and so on into the computer 4 constituting the system main body 1. Here, the input portion 5 may include the keyboard 4*b* of the computer 4, a mouse (not shown), or similar. The operator uses the input portion 5 to input an execution command to have the feature information extracting portion 6 and the output information generating portion 7 perform auxiliary processing to generate the map information M on the basis of the feature information F. Further, the operator inputs information for generating the map information M into the map information generation working area 9 on the basis of the feature information F output by the output portion 8 as a result of this auxiliary processing.

The feature information extracting portion 6 extracts feature information F satisfying a condition required to generate the map information M, including new generation and updating, from the feature database 2. Here, the feature information extracting portion 6 includes condition-satisfying feature extracting portion 31 for performing processing to extract feature information F mainly in order to generate new map information M, identical feature detecting portion 32, selecting portion 33, varied feature extracting portion 34 for performing processing to extract feature information F mainly in order to update the map information M, and update information generating portion 35. The feature information F that is extracted from the feature database 2 by the feature information extracting portion 6 and update information including the feature information F, to be described below, are output to the output information generating portion 7.

The condition-satisfying feature extracting portion 31 extracts feature information F satisfying a condition (to be referred to hereafter as a "map information generating condition") required to generate the map information M on the basis of any one or more of the disposition information F1, form information F2, and sourcing information F3 included in each piece of feature information F. Here, the map information generating condition is input by the operator through the input portion 5. At this time, the operator inputs a required map information generating condition through the input portion 5 in accordance with map generation support information generated by the output information generating portion 7 to be described below. Examples of the map information generating condition include a generation area condition defining an absolute coordinate area in which the map information M is to be generated, a content condition defining content such as the road network R and the type of road attribute information A as the content of the map information M to be generated, an accuracy condition defining the required accuracy for generating the map information M, a freshness condition defining the required freshness (the acquisition timing of the feature information F) for generating the map information M, and so on.

Here, by including the accuracy condition and the freshness condition in the map information generating conditions, feature information F having a lower level of accuracy or a lower level of freshness (an older acquisition timing) than a fixed level can be excluded from the feature information F used to generate the map information M. The condition-satisfying feature extracting portion 31 performs processing to extract feature information F satisfying the generation area condition on the basis of the disposition information F1, feature information F satisfying the content condition on the basis of the form information F2, feature information F satisfying the accuracy condition on the basis of the accuracy information F3a included in the sourcing information F3, and feature information F satisfying the freshness condition on the basis of the acquisition timing information F3b included in the sourcing information F3 from the feature database 2.

The identical feature detecting portion 32 detects the presence of plural feature information F relating to the same feature from the feature information F extracted by the condition-satisfying feature extracting portion 31. In this example, the determination as to whether features are identical is made on the basis of the identification symbols IDf of the extracted feature information F. Specifically, in this example, features are determined to be identical when feature information F allotted a common identification symbol IDf is present among the feature information F extracted by the condition-satisfying feature extracting portion 31. Examples of cases in which plural feature information F exists in relation to the same feature include a case in which information relating to different source types 17 (see FIG. 3) exists in duplicate in an identical absolute coordinate area, and a case in which information having the same source type 17 but different sourcing dates and times 21 (see FIG. 3) exists in duplicate.

The selecting portion 33 selects appropriate feature information F from the plural feature information F relating to the same feature, detected by the identical feature detecting portion 32. At this time, the selecting portion 33 performs processing to select feature information having an appropriate degree of accuracy on the basis of the accuracy information F3a in the sourcing information F3. Specifically, the selecting portion 33 is capable of performing processing to select the feature information F having the highest degree of accuracy from among the plural feature information F relating to the same feature, for example. As described above, in this example, the accuracy information F3a is constituted by the source type 17, the source scale 18, the positional accuracy 19, and the form accuracy 20. Accordingly, the degree of accuracy of the feature information F can be determined in accordance with the content of the information constituting the accuracy information F3a using a table defining accuracy levels, for example.

The selecting portion 33 is also capable of performing processing to select the appropriate feature information F on the basis of the acquisition timing information F3b in the sourcing information F3. Specifically, the selecting portion 33 is capable of performing processing to select the feature information F having the newest acquisition timing from among the plural feature information F relating to the same feature. As described above, in this example, the acquisition timing information F3b is constituted by the sourcing date and time 21 and the feature information generation date 22. Accordingly, the acquisition timing of the feature information F can be determined in accordance with the content of the information constituting the acquisition timing information F3b using a table defining freshness levels, for example. The selecting portion 33 is also capable of performing processing to select appropriate feature information F having a favorable balance of accuracy and freshness on the basis of both the accuracy information F3a and the acquisition timing information F3b in the sourcing information F3.

The varied feature extracting portion 34 extracts feature information F relating to features that have varied from past feature conditions on the basis of any one or more of the identification symbol IDf, the disposition information F1 and the form information F2 of each piece of feature information F, and the acquisition timing information F3b of the sourcing information F3. As described above, features that have varied from past feature conditions include all features that have been added, removed, or modified relative to the past feature condition. In this example, the varied feature extracting portion 34 performs processing to detect additions, deletions, modifications and so on of the feature information F stored in the feature database 2 following the acquisition of new sourcing source information D on the basis of the identification symbol IDf and acquisition timing information F3b of each piece of feature information F, and extract the feature information F relating to the features that have varied from past feature conditions. As described above, a new identification symbol IDf is allocated to feature information F relating to an added feature. Further, the identification symbol IDf of feature information F relating to a removed feature is invalidated. For a modified feature, a new identification symbol IDf is allocated and the identification symbol IDf of the pre-modification feature information F is invalidated. Hence, specifically, the varied feature extracting portion 34 extract feature information F allotted a new identification symbol IDf that is different to the identification symbol IDf of the past feature information F or past feature information F having an invalidated identification symbol IDf from the feature database 2. At this time, a determination is made whether the feature information F is past feature information F on the basis of the acquisition timing information F3*b* in the sourcing information F3.

The update information generating portion 35 generates update information indicating the content of the variation in the feature information F detected to have varied by the varied feature extracting portion 34. Here, the update information is information required to output the pre-variation and post-variation conditions of the feature information F detected to have varied by the varied feature extracting portion 34 to the output portion 8 in a comparable manner. Specifically, when a feature is newly added, the update information includes the fact that corresponding past feature information F does not exist as well as the feature information F relating to the newly added feature. When a feature is removed, the update information includes the fact that corresponding new feature information F does not exist as well as the past feature information F. When a feature is modified, the update information includes the past, pre-modification feature information F and the new, post-modification feature information F. The update information generated by the update information generating portion 35 is transmitted to the output information generating portion 7, formed into information that can be output by the output portion 8, and then output by the output portion 8.

Figure 8:
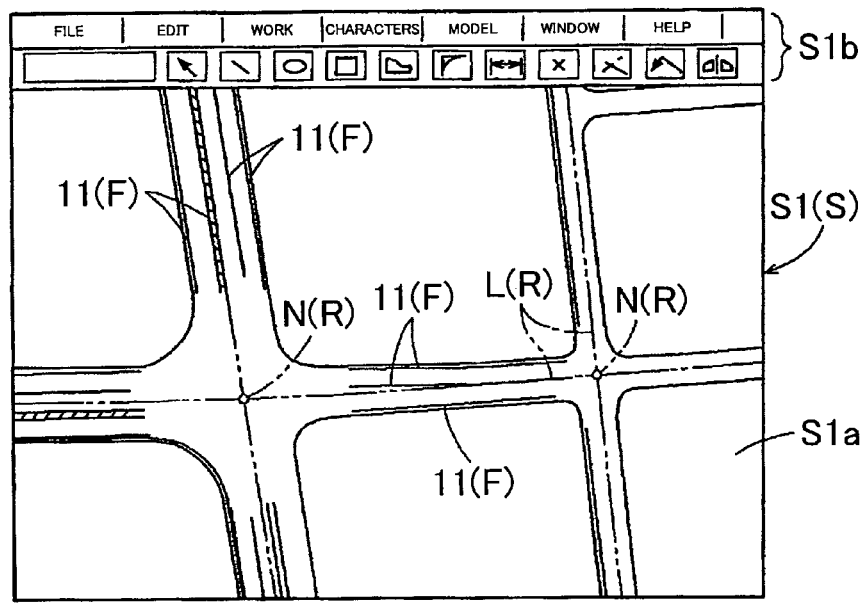
FIG. 8 shows an example of road network generation support information.
Figure 9:
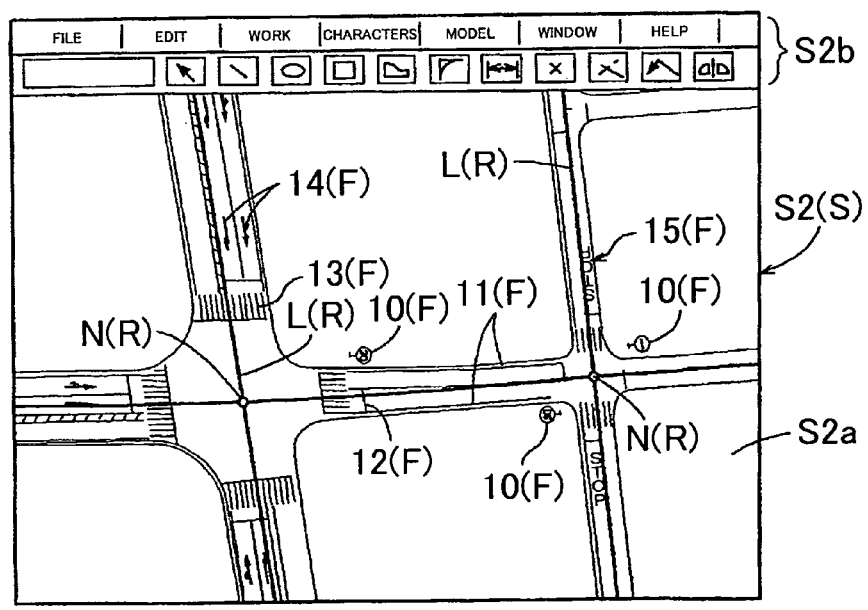
FIG. 9 shows an example of road attribute information generation support information.

The output information generating portion 7 generates map generation support information S for supporting an operation to generate the map information M in a manner enabling output by the output portion 8. Here, the output information generating portion 7 includes a road network generation supporting portion 38 for generating output information used to support an operation to generate the road network R, and a road attribute information generation supporting portion 39 for generating output information used to support an operation to generate the road attribute information A. FIG. 8 is a view showing an example of road network generation support information S1 generated by the road network generation supporting portion 38. FIG. 9 is a view showing an example of road attribute information generation support information S2 generated by the road attribute information generation supporting portion 39.

As shown in FIG. 8, the road network generation supporting portion 38 extracts the feature information F required to generate the road network R and forms the extracted feature information F into feature image information S1*a* that can be output by the output portion 8. Specifically, feature information F relating to road area defining features defining a road area, such as painted lane boundaries 11, central dividers, curbs, safety fences, buildings, and bodies of water, corresponds to the feature information F required to generate the road network R. On the basis of the feature image information S1*a*, the road network generation supporting portion 38 also generates graphical user interface information S1*b* relating to command items (commands) used when the operator performs an operation to generate the road network R. The road network generation support information S1 is constituted such that the graphical user interface information S1*b* is disposed adjacent to a screen frame on which the feature image information S1*a* is displayed. The operator generates the road network R by selecting a command item included in the graphical user interface information S1*b* output by the output portion 8 to input and edit nodes N and links L on the screen frame displaying the feature image information S1*a*. The information generated during the operation to generate the road network R is stored temporarily in the map information generation working area 9.

As shown in FIG. 9, the road attribute information generation supporting portion 39 extracts various feature information F required to generate the road attribute information A and synthesizes the extracted feature information F with the road network R to form feature image information S2*a* that can be output by the output portion 8. Substantially all of the feature information F stored in the feature database 2 corresponds to the feature information F required to generate the road attribute information A. On the basis of the feature image information S2*a*, the road attribute information generation supporting portion 39 also generates graphical user interface information S2*b* relating to command items (commands) used when the operator performs an operation to generate the road attribute information A. The road attribute information generation support information S2 is constituted such that the graphical user interface information S2*b* is disposed adjacent to a screen frame on which the feature image information S2*a* is displayed. The operator generates the road attribute information A by selecting a command item included in the graphical user interface information S2*b* output by the output portion 8 to input and edit various types of road attribute information A in association with the road network R on the screen frame displaying the feature image information S2*a*. The information generated during the operation to generate the road attribute information A is stored temporarily in the map information generation working area 9.

As described above, the output information generating portion 7 generates the update information generated by the update information generating portion 35 in a manner enabling output by the output portion 8. The update information is output by the output portion 8 in combination with the road network generation support information S1 or the road attribute information generation support information S2 as the feature image information S1*a* or S2*a* relating to the feature information F included in the update information. On the basis of the feature information F included in the update information, the operator updates the road network R or the road attribute information A using the road network generation support information S1 or the road attribute information generation support information S2.

The output portion 8 outputs the road network generation support information S1, the road attribute information generation support information S2, update information, and so on, including the feature information F, generated by the output information generating portion 7. Here, the output portion 8 includes a monitor 4*a* of the computer 4, and therefore outputs the information described above through display. Although not shown in the drawing, another output device such as a printer may be used as the output portion 8.

The map information generation working area 9 is a working memory area for generating the map information M (including new generation and updating) including the road network R and the road attribute information A. The map information generation working area 9 stores the map information M generated during an operation, the content of the map generation support information S, and so on temporarily. The map information M generated in the feature information generation working area 9 is input into the map database 3 in accordance with a command from the input portion 5. Thus, the map database 3 is generated and updated.

Next, an exemplary method for generating map information will be described in accordance with the flowchart shown in FIG. 10. The exemplary method may be implemented, for example, by one or more components of the above-described map database generating system. However, even though the exemplary structure of the above-described map database generating system may be referenced in the description, it should be appreciated that the structure is exemplary, and the exemplary method need not be limited by any of the above-described exemplary structure.

Figure 10:
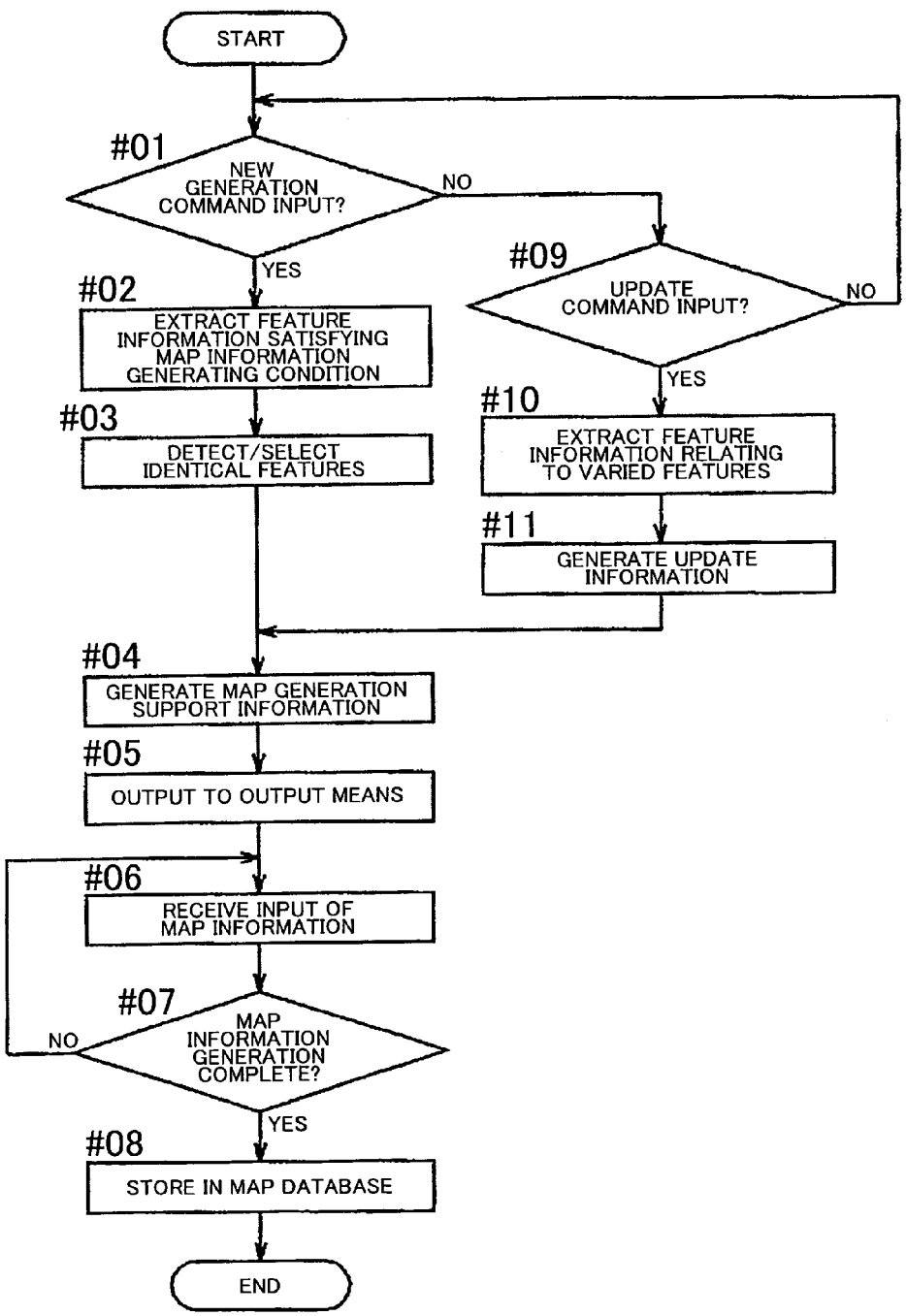
FIG. 10 is a flowchart showing an exemplary map information generation method.

As shown in FIG. 10, when a command is input through the input portion 5 to execute processing for newly generating the map information M (step #01: YES), map information M new generation processing is performed. First, processing to extract feature information F satisfying the map information generating condition is performed by the condition-satisfying feature extracting portion 31 of the feature information extracting portion 6 (step #02). Note that the map information generating condition is included in the command to execute processing for newly generating the map information M. The identical feature detecting portion 32 and the selecting portion 33 then detect identical features and select appropriate feature information F from the detected identical features (step #03). The output information generating portion 7 then generates the map generation support information S including the road network generation support information S1 shown in FIG. 8 and the road attribute information generation support information S2 shown in FIG. 9 (step #04). Next, the generated map generation support information S is output by the output portion 8 (step #05). Input of the map information M by the operator is then received (step #06). The operator inputs the map information M using the graphical user interface information S1b and S2b and so on included in the map generation support information S. Input of the map information M continues to be received until generation of the map information M is complete (step #07: NO). When generation of the map information M is complete (step #07: YES), the generated map information M is stored in the map database 3 (step #08).

On the other hand, when a command to execute processing for updating the map information M is input through the input portion 5 (step #09: YES) rather than the command to execute processing for newly generating the map information M (step #01: NO), map information M updating processing is performed. First, feature information F relating to features that have varied from past feature conditions is extracted by the varied feature extracting portion 34 of the feature information extracting portion 6 (step #10). The update information generating portion 35 then generates update information indicating the content of the variation in relation to the feature information F detected to have varied (step #11). Next, the output information generating portion 7 generates the map generation support information S in relation to the feature information F included in the update information (step #04). The processing of the subsequent steps #05 to #08 is as described above.

Figure 11:
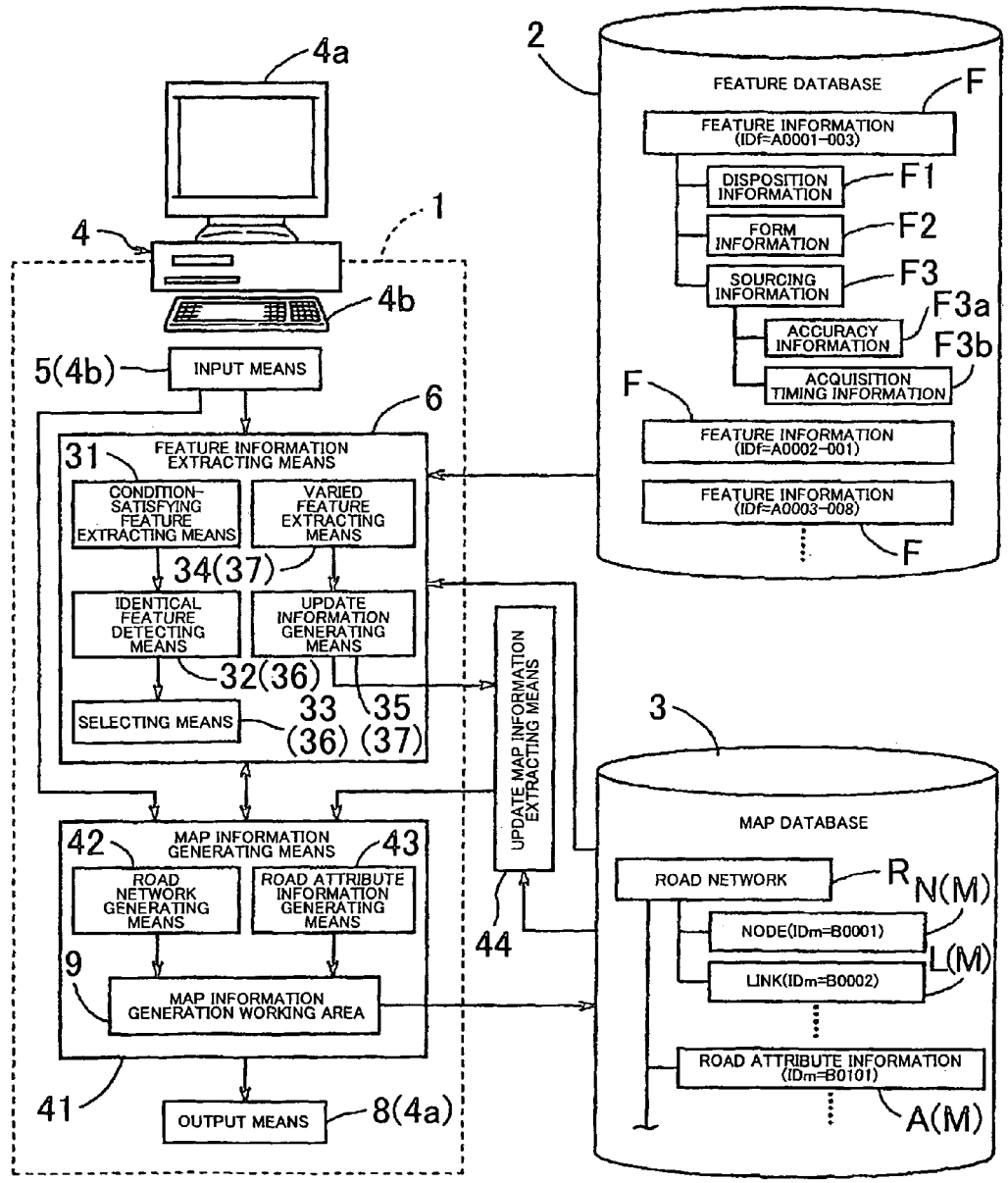
FIG. 11 shows a schematic structure of an exemplary map database generating system.

FIG. 11 is an illustrative view showing the schematic structure of another example of a map database generating system. In place of the output information generating portion 7 of the previous example (FIG. 1), the system main body 1 of this map database generating system includes map information generating portion 41 for automatically generating the map information M, and update map information extracting portion 44 for extracting map information M that needs to be updated in association with varied features. This map database generating system also differs from the previous example in that the processing to generate (including new generation and updating) the map information M, which is performed by the operator in the previous example, is performed automatically by the system. The content of the feature database 2 and the map database 3 is similar to that described above. The structure of each portion of the system main body 1 according to this embodiment will be described below.

The input portion 5 enables the operator to input commands, information and so on into the computer 4 constituting the system main body 1. Here, the input portion 5 includes the keyboard 4b of the computer 4, a mouse (not shown), or similar. The operator uses the input portion 5 to input a command to execute processing for generating the map information M, including new generation and updating, on the basis of the feature information F, and to input information such as the map information generating condition, which serves as a condition when executing this processing. The feature information extracting portion 6 and the map information generating portion 41 execute processing in accordance with the commands, conditions and so on input through the input portion 5. At this time, the feature information extracting portion 6 performs processing to extract feature information F from the feature database 2 in accordance with the processing execution command and map information generating condition input through the input portion 5. The map information generating portion 41 performs processing to generate the map information M on the basis of the extracted feature information F.

The feature information extracting portion 6 performs processing to extract feature information F satisfying a condition required to generate the map information M, including new generation and updating, from the feature database 2. Here, the feature information extracting portion 6 includes the condition-satisfying feature extracting portion 31 for performing processing to extract feature information F mainly in order to generate new map information M, the identical feature detecting portion 32, the selecting portion 33, the varied feature extracting portion 34 for performing processing to extract feature information F mainly in order to update the map information M, and the update information generating portion 35.

When a command is input through the input portion 5 to execute processing for newly generating the map information M, processing to extract the feature information F is performed by the condition-satisfying feature extracting portion 31, the identical feature detecting portion 32 and the selecting portion 33, and when a command to execute processing for updating the map information M is input through the input portion 5, processing to extract the feature information F is performed by the varied feature extracting portion 34 and the update information generating portion 35. The feature information F that is extracted from the feature database 2 by the feature information extracting portion 6 and update information including the feature information F, to be described below, are output to the map information generating portion 41.

The condition-satisfying feature extracting portion 31 extracts feature information F satisfying the map information generating condition, which is required to generate the map information M, on the basis of any one or more of the disposition information F1, the form information F2, and the sourcing information F3 included in each piece of feature information F. Here, the map information generating condition is set in accordance with a processing condition relating to new generation, updating and so on of the map information M, which is input through the input portion 5, the content of the map information M generated in the map information generating portion 41, and so on. The content of the map information generating conditions may be set similarly to that of the previous example described above.

The identical feature detecting portion 32 and the selecting portion 33 may be structured similarly to their counterparts in the previous example.

The varied feature extracting portion 34 extracts feature information F relating to features that have varied from past feature conditions on the basis of any one or more of the identification symbol IDf, the disposition information F1 and the form information F2 of each piece of feature information F, and the acquisition timing information F3b of the sourcing information F3. The update information generating portion 35 generates update information indicating the content of the variation in the feature information F detected to have varied by the varied feature extracting portion 34. The varied feature extracting portion 34 and the update information generating portion 35 may be structured similarly to their counterparts in the previous example described above.

The update map information extracting portion 44 extract map information M that needs to be updated from the map database 3. At this time, the map information M that needs to be updated is extracted on the basis of past feature information F relating to features that have varied from past feature conditions, which is included in the update information generated by the update information generating portion 35. Specifically, the update map information extracting portion 44 extracts the map information M using the table shown in FIG. 7, which is stored in the map database 3. In other words, the map database 3 includes a table storing information regarding the identification symbol IDf of the map information M serving as the generation source of each piece of map information M in association with the identification symbol IDm of each piece of map information M. The update map information extracting portion 44 extracts map information M including, as a generation source, the past feature information F included in the update information, on the basis of the table shown in FIG. 7.

The map information generating portion 41 performs processing to generate the map information M forming the map database 3, on the basis of the feature information F extracted by the feature information extracting portion 6 or the update information including the feature information F. Here, the map information generating portion 41 includes a road network generating portion 42 for generating the road network R, a road attribute information generating portion 43 for generating the road attribute information A, and the map information generation working area 9, which serves as a working memory area in which the road network generating portion 42 and the road attribute information generating portion 43 perform processing to generate the map information M (including new generation and updating).

The road network generating portion 42 performs processing to generate the nodes N and links L constituting the road network R using the feature information F required to generate the road network R. Feature information F relating to road area defining features that defines a road area, such as the painted lane boundaries 11, central dividers, curbs, safety fences, buildings, and bodies of water, corresponds to the feature information F required to generate the road network R. Specifically, in the processing for generating the nodes N and links L, first the positions of the two width direction ends of a road are determined from the feature information F relating to the road area defining features. Then, on the basis of the determined positions of the two width direction sides of the road, the width direction central position of the road is determined. This processing is performed for the feature information F relating to all of the road area defining features in the subject area. An intersection point between lines connecting the determined width direction central positions of the roads is then set as a node N. A line connecting two adjacent nodes N existing in the length direction of the road is then set as a link L. As a result, of this processing, the road network R is generated.

The road attribute information generating portion 43 performs processing to generate the various types of road attribute information A associated with the road network R using the various types of feature information F required to generate the road attribute information A. Substantially all of the feature information F stored in the feature database 2 corresponds to the feature information F required to generate the road attribute information A. Specifically, in the processing for generating the various types of road attribute information A, first, on the basis of the disposition information F1 included in the feature information F, the reference point P is set in a position on the road network R which is closest to the position of the feature indicated in the feature information F. Then, disposition information indicating the position of the feature is generated from the offset distance, bearing, planar disposition, linear disposition, and so on relative to the reference point P. Next, on the basis of the form information F2 included in the feature information F, the various types of information constituting the road attribute information A, such as the direction information W, type information and theme information described above, are set in accordance with the content of the road attribute information A. As a result of this processing, the road attribute information A is generated.

Note that the map information generating portion 41 uses the extraction result produced by the update map information extracting portion 44 when performing processing to generate the map information M forming the map database 3 on the basis of the update information including the feature information F. In other words, the map information generating portion 41 extracts only the map information M extracted by the update map information extracting portion 44 from the map database 3, and updates the map information M on the basis of the feature information F included in the update information. In so doing, the processing load of the map information generating portion 41 can be lightened.

The output portion 8 outputs information such as commands and conditions that can be input through the input portion 5, and also outputs map information M generation results produced by the map information generating portion 41, the state of the generation processing, and so on. Here, the output portion 8 includes the monitor 4a of the computer 4, and therefore output the information described above through display. Although not shown in the drawing, another output device such as a printer may be used as the output portion 8.

Next, an exemplary method for generating map information will be described in detail in accordance with the flowcharts shown in FIGS. 12 to 14. The exemplary method may be implemented, for example, by one or more components of the above-described map database generating system. However, even though the exemplary structure of the above-described map database generating system may be referenced in the description, it should be appreciated that the structure is exemplary, and the exemplary method need not be limited by any of the above-described exemplary structure.

As shown in FIG. 12, when a command is input through the input portion 5 to execute processing for newly generating the map information M (step #21:YES), map information M new generation processing is performed (step #23). Note that at least a generation area condition defining an absolute coordinate area for generating the map information M is included in the command to execute processing for newly generating the map information M (step #23) as a map information generating condition. On the other hand, when a command to execute processing for updating the map information M is input through the input portion 5 (step #22: YES) rather than the command to execute processing for newly generating the map information M (step #21: NO), map information M updating processing is performed (step #24). The map information M generated in the new map information M generation processing or the map information M updating processing is stored in the map database 3 (step #25). The map information M generation processing is then terminated.

Figure 13:
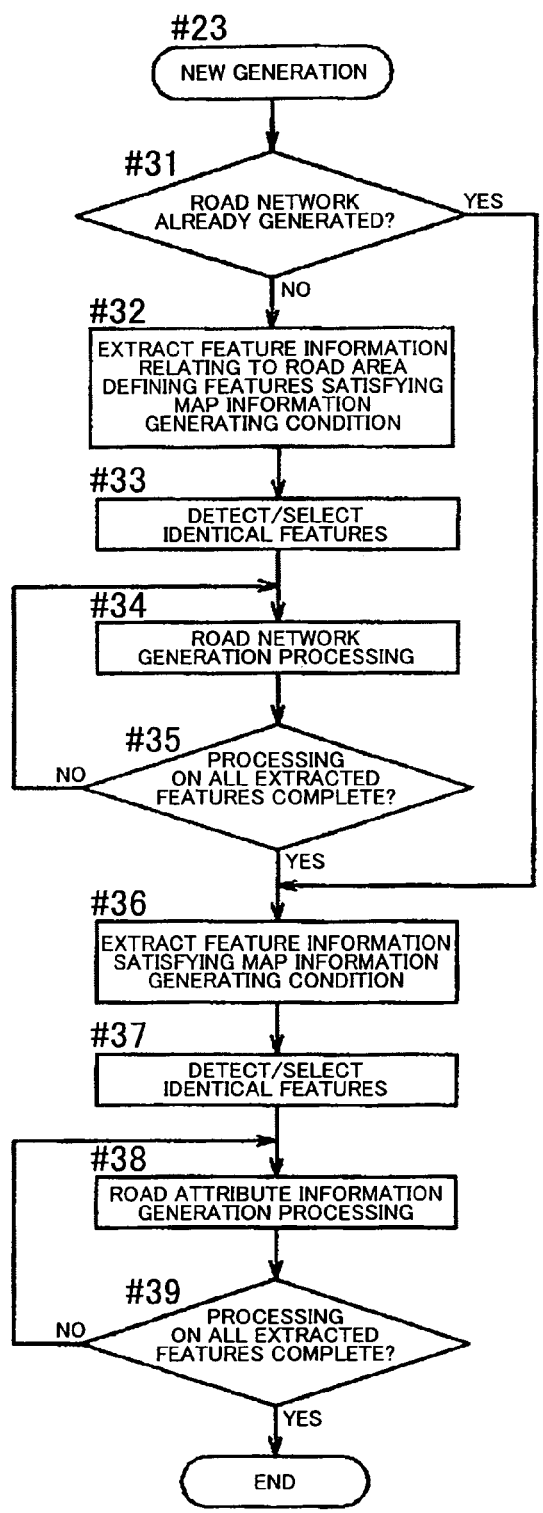
FIG. 13 is a flowchart showing an exemplary new map information generation method.

FIG. 13 shows an exemplary method for generating new map information (e.g., step #23). As shown in FIG. 13, in the new map information M generation processing, first the map database 3 is searched to determine whether a road network R has already been generated in the absolute coordinate area defined in the generation area condition serving as the map information generating condition (step #31). When a road network R has not yet been generated (step #31: NO), a road network R is generated. First, processing to extract feature information F relating to the road area defining features satisfying the map information generating condition is performed by the condition-satisfying feature extracting portion 31 of the feature information extracting portion 6 (step #32). The identical feature detecting portion 32 and the selecting portion 33 then detect identical features and select appropriate feature information F from the detected identical features (step #33). The road network generating portion 42 of the map information generating portion 41 then performs processing to generate a road network R (step #34). This road network R generation processing (step #34) is performed on all of the feature information F relating to the road area defining features included in the absolute coordinate area defined by the generation area condition, which is extracted in the step #32 (step #35).

On the other hand, when a road network R has already been generated (step #31: YES), road network R generation processing is not performed, and only road attribute information A generation processing is performed. First, processing to extract feature information F satisfying the map information generating condition is performed by the condition-satisfying feature extracting portion 31 of the feature information extracting portion 6 (step #36). Next, the identical feature detecting portion 32 and selecting portion 33 detect identical features and select appropriate feature information F from the detected identical features (step #37). The road attribute information generating portion 43 of the map information generating portion 41 then performs processing to generate the road attribute information A (step #38). This road attribute information A generation processing (step #38) is performed on all of the feature information F relating to the features included in the absolute coordinate area defined by the generation area condition, which is extracted in the step #36 (step #39). The new map information M generation processing (step #23) is then terminated.

Figure 14:
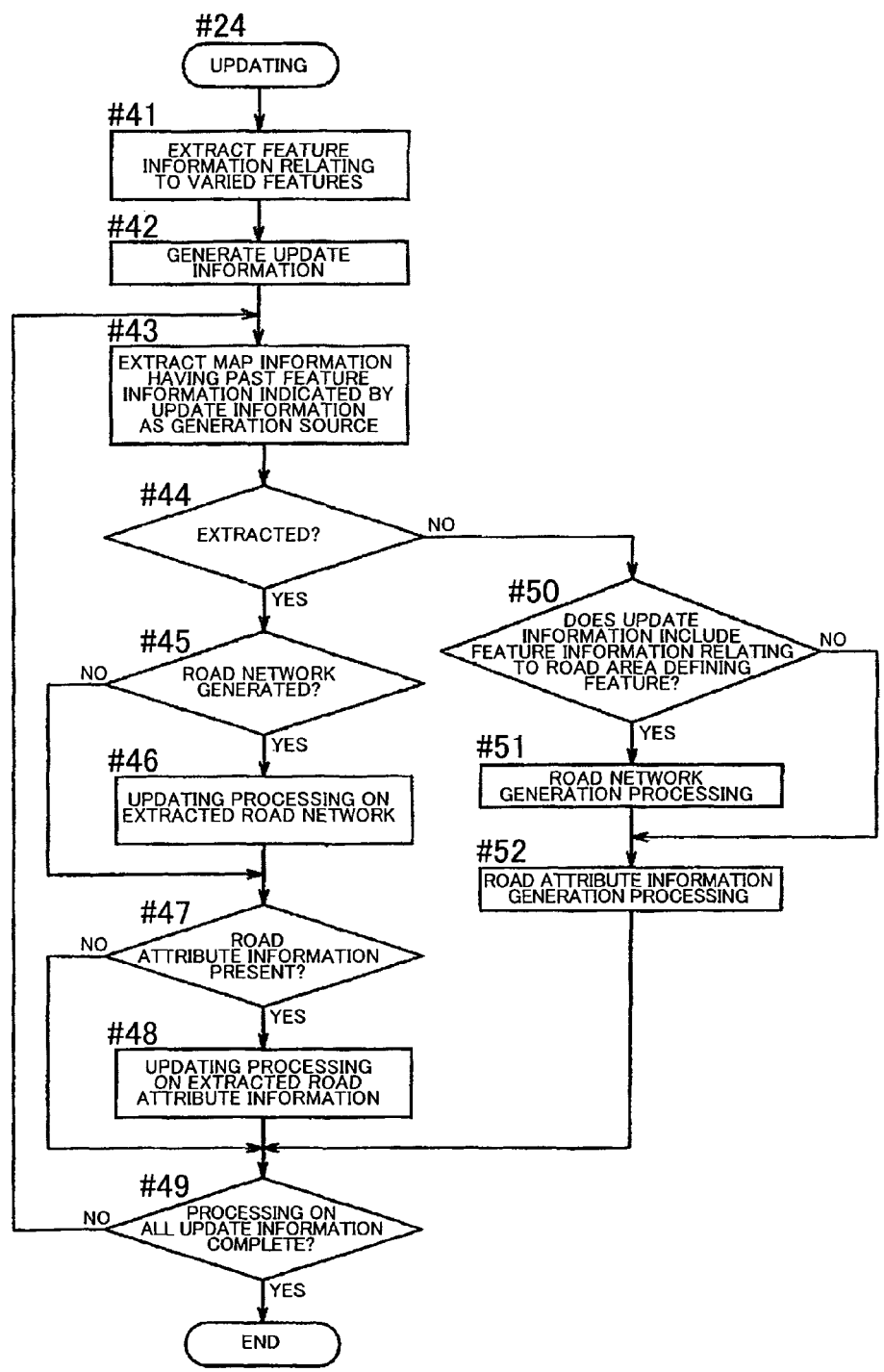
FIG. 14 is a flowchart showing an exemplary map information updating method.
Figure 15:
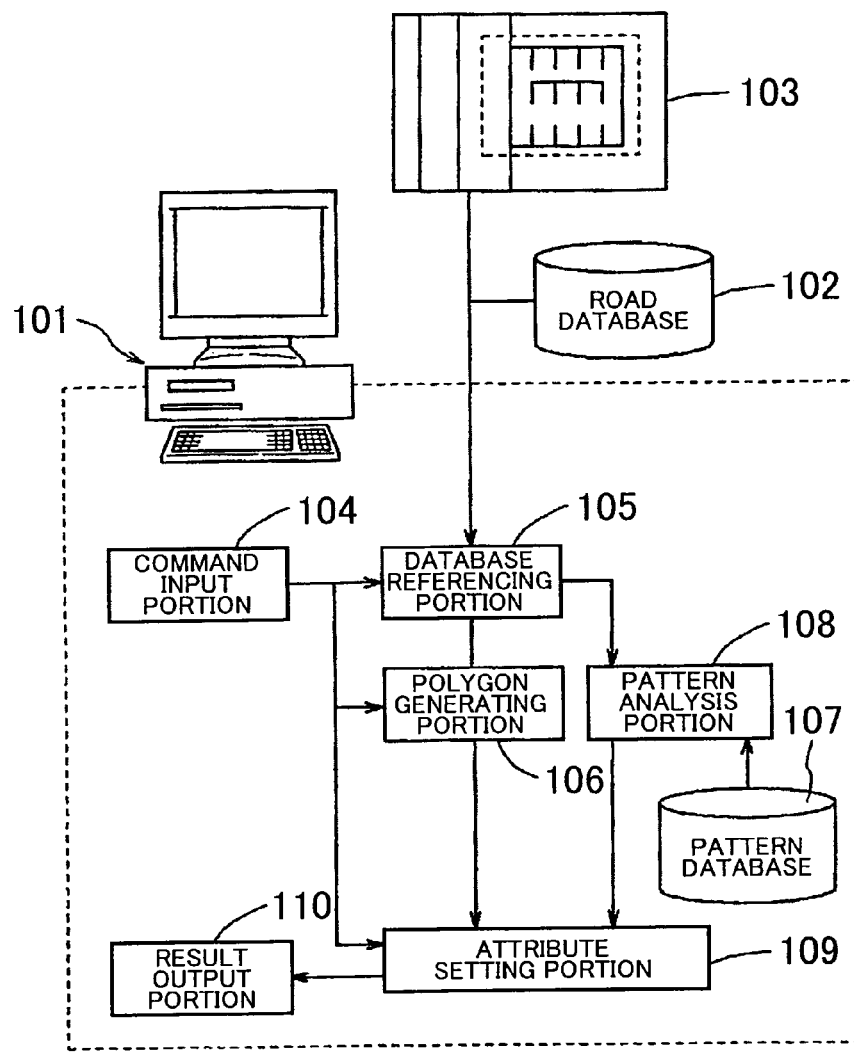
FIG. 15 shows the schematic structure of a map database generating system according to the related art.

As shown in FIG. 14, in map information M updating processing (step #24), first feature information F relating to features that have varied from past feature conditions is extracted by the varied feature extracting portion 34 of the feature information extracting portion 6 (step #41). The update information generating portion 35 then generates update information expressing the content of the variation in relation to the feature information F detected to have varied in the step #41 (step #42). Next, the update map information extracting portion 44 extracts map information M having the past feature information F indicated by the update information generated in the step #42 as a generation source (step #43). When map information M having the past feature information F indicated by the update information as a generation source is extracted (step #44: YES), the extracted map information M is updated in accordance with the condition of the varied feature. Specifically, when map information M constituting a road network R is present in the extracted map information M (step #45: YES), first, update processing of the extracted road network R is performed (step #46). When map information M constituting a road network R is not present in the extracted map information M (step #45: NO), the processing of the step #46 is not performed. Next, when map information M constituting road attribute information A is present within the extracted map information M (step #47: YES), update processing of the extracted road attribute information A is performed (step #48). When map information M constituting road attribute information A is not present in the extracted map information M (step #47: NO), the processing of the step #48 is not performed.

On the other hand, when map information M having the past feature information F indicated by the update information as a generation source is not extracted (step #44: NO), a determination is made whether feature information F relating to the road area defining features is included in the update information (step #50). When feature information F relating to the road area defining features is included in the update information (step #50: YES), the road network generating portion 42 of the map information generating portion 41 perform road network R generation processing on the basis of the feature information F relating to the road area defining features (step #51). When feature information F relating to the road area defining features is not included in the update information (step #50: NO), the road attribute information generating portion 43 of the map information generating portion 41 performs road attribute information A generation processing on the basis of the feature information F (step #52). The processing of the steps #43 to #52 described above is performed until all of the feature information F included in the update information is processed (step #49). The map information M updating method is then terminated.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

In each of the above examples, the varied feature extracting portion 34 extracts feature information F relating to features that have varied from past feature conditions on the basis of the identification symbol IDf and the acquisition timing information F$3b$ of each piece of feature information F. However, the method by which the varied feature extracting portion 34 constituting the updating portion 37 extracts feature information F relating to features that have varied from past feature conditions is not limited thereto. For example, the feature information F relating to features that have varied from past feature conditions may be extracted on the basis of the disposition information F1, the form information F2, and the acquisition timing information F$3b$ of the sourcing information F3, for example. In this case, variation in the feature information F can be extracted directly on the basis of the disposition information F1 and the form information F2, regardless of the method of allocating the identification symbols IDf. Alternatively, the feature information F relating to features that have varied from past feature conditions may be extracted by the varied feature extracting portion 34 on the basis of any one of, or an arbitrary combination of, the identification symbol IDf, the disposition information F1 and the form information F2, as well as the acquisition timing information F3b of the sourcing information F3.

In each of the above examples, the identical feature extracting portion 32 determines whether plural feature information F relating to the same feature exists within the feature information F extracted by the condition-satisfying feature extracting portion 31 on the basis of the identification symbol IDf of each piece of extracted feature information F. However, the method of determining the presence of identical features is not limited thereto. For example, the determination whether plural feature information F relating to the same feature exists may be made on the basis of the disposition information F1 and the form information F2. In this case, identical features and the like can be determined to exist when features indicated by the disposition information F1 have a substantially identical spatial disposition and one or more matching items exists in relation to the form of the features indicated by the form information F2. Alternatively, the identical feature detecting portion 32 may detect the presence or absence of plural feature information F relating to the same feature on the basis of any one of, or an arbitrary combination of, the identification symbol IDf, the disposition information F1, and the form information F2.

In the first example described above, the map database generating system is a support system for supporting generation of the map database 3 by an operator, whereas in the second example, the map database generating system is an automatic map database generating system for generating the map database 3 automatically. However, these examples may be appropriately combined such that the system generates a part of the map information M automatically and supports generation of the remainder of the map information M by the operator.

In each of the above examples, the map database 3 is a map database used in a car navigation system. However, the scope of the disclosure is not limited thereto. The disclosed principles may also be applied to a generating system for generating a map database used in various types of navigation systems, for example, a navigation system for a pedestrian, a bicycle, or the like, which is installed in a portable machine, or a map database used in a navigation system for an aircraft or ship. The disclosed principles may also be applied to a generating system for generating various types of electronic map databases not used in a navigation system.

What is claimed is:

1. A map database generating system for generating a map database, the map database including a road network comprising a plurality of nodes having position information and a link connecting two of the nodes, and road attribute information associated with the road network, the system comprising:
   a non-transitory memory including a feature database that stores feature information relating to features existing on a road and on a periphery of the road, each piece of feature information being associated with a unique identification symbol, each piece of feature information including:
   disposition information expressing a spatial disposition of the feature independently of the road network;
   form information that defines a physical form of the feature as the feature exists on or adjacent to the road;
   accuracy information expressing an accuracy of the feature information; and
   acquisition timing information expressing an acquisition timing of the feature information;
   wherein identification symbols having at least one part in common are allocated to feature information relating to an identical feature in the feature database; and
   a processor that is programmed to:
   output the feature information stored in the feature database;
   input map information constituting the map database, the map information being generated based on the output feature information;
   detect a presence of plural feature information relating to an identical feature but having different accuracy information from the feature database, the detection being made based on the acquisition timing information and at least one of the identification symbol, the disposition information, and the form information of each piece of feature information; and
   select feature information having an accuracy required to generate the map information as the feature information to be output, the selection being made on the basis of the accuracy information included in each piece of detected feature information.

2. The map database generating system according to claim 1, wherein the processor is programmed to extract, as the feature information to be output, feature information that satisfies a condition required to generate the map information from the feature database on the basis of at least one of the identification symbol, the disposition information, the form information, the accuracy information, and the acquisition timing information of each piece of feature information.

3. The map database generating system according to claim 1, wherein the processor is programmed to:
   extract feature information relating to a feature that has varied from a past feature condition from the feature database on the basis of the disposition information of each piece of feature information; and
   generate update information expressing a content of the variation in the extracted feature information in a manner enabling output.

4. The map database generating system according to claim 1, wherein the stored features include at least one of a painted feature provided on a road, a traffic regulation feature expressing a traffic regulation, and a road area defining feature defining a road area.

5. The map database generating system according to claim 1, wherein the road attribute information includes at least one of point attribute information associated with a point on the road network, section attribute information associated with a fixed section along the road network, and route attribute information associated with a single node on the road network and one or more links connected to the node.

6. The map database generating system according to claim 1, wherein the map database is a map database used in a car navigation system.

7. A map database generating system for generating a map database including a road network comprising a plurality of nodes having position information and a link connecting two of the nodes, and road attribute information associated with the road network, the system comprising:
   a non-transitory memory including a feature database that stores feature information relating to features existing on a road and on a periphery of the road, each piece of feature information being associated with a unique identification symbol, each piece of feature information including:
   disposition information expressing a spatial disposition of the feature independently of the road network;
   form information that defines a physical form of the feature as the feature exists on or adjacent to the road;

accuracy information expressing an accuracy of the feature information; and acquisition timing information expressing an acquisition timing of the feature information;

wherein identification symbols having at least one part in common are allocated to feature information relating to an identical feature in the feature database; and a processor that is programmed to:

output the feature information stored in the feature database;

input map information constituting the map database, the map information being generated based on the output feature information;

detect a presence of plural feature information relating to an identical feature but having different accuracy information from the feature database, the detection being made based on the acquisition timing information and at least one of the identification symbol, the disposition information, and the form information of each piece of feature information;

select feature information having an accuracy required to generate the map information on the basis of the accuracy information included in each piece of detected feature information; and generate the map information on the basis of the selected feature information.

8. The map database generating system according to claim 7, wherein the processor is programmed to:

extract feature information that satisfies a condition required to generate the map information from the feature database on the basis of the disposition information of each piece of feature information, generate the map information on the basis of the extracted feature information.

9. The map database generating system according to claim 7, wherein the processor is programmed to:

extract feature information relating to a feature that has varied from a past feature condition from the feature database on the basis of the acquisition timing information and at least one of the identification symbol, the disposition information, and the form information of each piece of feature information;

generate update information expressing a content of the variation in the extracted feature information; and updates the map information on the basis of the update information.

10. The map database generating system according to claim 7, wherein the stored features include at least one of a painted feature provided on a road, a traffic regulation feature expressing a traffic regulation, and a road area defining feature defining a road area.

11. The map database generating system according to claim 7, wherein the road attribute information includes at least one of point attribute information associated with a point on the road network, section attribute information associated with a fixed section along the road network, and route attribute information associated with a single node on the road network and one or more links connected to the node.

12. The map database generating system according to claim 7, wherein the map database is a map database used in a car navigation system.

13. A map database generating method for generating a map database, the map database including a road network comprising a plurality of nodes having position information and a link connecting two of the nodes, and road attribute information associated with the road network, the method comprising:

accessing, with a processor, stored feature information relating to features existing on a road and on a periphery of the road, each piece of feature information being associated with a unique identification symbol, each piece of feature information including:

disposition information expressing a spatial disposition of the feature independently of the road network;

form information that defines a physical form of the feature as the feature exists on or adjacent to the road;

accuracy information expressing an accuracy of the feature information; and acquisition timing information expressing an acquisition timing of the feature information;

outputting, with the processor, the feature information stored in the feature database;

inputting, with the processor, map information constituting the map database, the map information being generated based on the output feature information;

detecting, with the processor, a presence of plural feature information relating to an identical feature but having different accuracy information from the feature database, the detection being made based on the acquisition timing information and at least one of the identification symbol, the disposition information, and the form information of each piece of feature information; and selecting, with the processor, feature information having an accuracy required to generate the map information as the feature information to be output, the selection being made on the basis of the accuracy information included in each piece of detected feature information;

wherein identification symbols having at least one part in common are allocated to feature information relating to an identical feature in the feature database.

14. A non-transitory computer-readable storage medium storing a computer-executable program usable to generate a map database including a road network comprising a plurality of nodes having position information and a link connecting two of the nodes, and road attribute information associated with the road network, the program comprising:

instructions for accessing stored feature information relating to features existing on a road and on a periphery of the road, each piece of feature information being associated with a unique identification symbol, each piece of feature information including:

disposition information expressing a spatial disposition of the feature independently of the road network;

form information that defines a physical form of the feature as the feature exists on or adjacent to the road;

accuracy information expressing an accuracy of the feature information; and acquisition timing information expressing an acquisition timing of the feature information;

instructions for outputting the feature information stored in the feature database; and instructions for inputting map information constituting the map database, the map information being generated based on the output feature information;

instructions for detecting a presence of plural feature information relating to an identical feature but having different accuracy information from the feature database, the detection being made based on the acquisition timing information and at least one of the identification symbol, the disposition information, and the form information of each piece of feature information; and instructions for selecting feature information having an accuracy required to generate the map information as the feature information to be output, the selection being made on the basis of the accuracy information included in each piece of detected feature information;

wherein identification symbols having at least one part in common are allocated to feature information relating to an identical feature in the feature database.

15. A map database generating method for generating a map database including a road network comprising a plurality of nodes having position information and a link connecting two of the nodes, and road attribute information associated with the road network, the method comprising:

accessing, with a processor, stored feature information relating to features existing on a road and on a periphery of the road, each feature being associated with a unique identification symbol, each piece of feature information including:

disposition information expressing a spatial disposition of the feature independently of the road network;

form information that defines a physical form of the feature as the feature exists on or adjacent to the road;

accuracy information expressing an accuracy of the feature information; and acquisition timing information expressing an acquisition timing of the feature information; and outputting the feature information stored in the feature database;

inputting map information constituting the map database, the map information being generated based on the output feature information;

detecting, with the processor, a presence of plural feature information relating to an identical feature but having different accuracy information from the feature database, the detection being made based on the acquisition timing information and at least one of the identification symbol, the disposition information, and the form information of each piece of feature information;

selecting, with the processor, feature information having an accuracy required to generate the map information on the basis of the accuracy information included in each piece of detected feature information; and generating, with the processor, the map information on the basis of the selected feature;

wherein identification symbols having at least one part in common are allocated to feature information relating to an identical feature in the feature database.

16. A non-transitory computer-readable storage medium storing a computer-executable program usable to generate a map database including a road network comprising a plurality of nodes having position information and a link connecting two of the nodes, and road attribute information associated with the road network, the program comprising:

instructions for accessing stored feature information relating to features existing on a road and on the periphery of the road, each feature being associated with a unique identification symbol, each piece of feature information including:

disposition information expressing a spatial disposition of the feature independently of the road network;

form information that defines a physical form of the feature as the feature exists on or adjacent to the road;

accuracy information expressing an accuracy of the feature information; and acquisition timing information expressing an acquisition timing of the feature information; and instructions for outputting the feature information stored in the feature database;

instructions for inputting map information constituting the map database, the map information being generated based on the output feature information;

instructions for detecting a presence of plural feature information relating to an identical feature but having different accuracy information from the feature database, the detection being made based on the acquisition timing information and at least one of the identification symbol, the disposition information, and the form information of each piece of feature information;

instructions for selecting feature information having an accuracy required to generate the map information on the basis of the accuracy information included in each piece of detected feature information; and instructions for generating the map information on the basis of the selected feature;

wherein identification symbols having at least one part in common are allocated to feature information relating to an identical feature in the feature database.

* * * * *